United States Patent [19]
Hoogerhyde et al.

[11] Patent Number: 5,448,687
[45] Date of Patent: Sep. 5, 1995

[54] COMPUTER-ASSISTED DESIGN SYSTEM FOR FLATTENING A THREE-DIMENSIONAL SURFACE AND FOR WRAPPING A FLAT SHAPE TO A THREE-DIMENSIONAL SURFACE

[75] Inventors: Randall J. Hoogerhyde, Grand Rapids; Chien T. Wu, Ada; Mayank Anjaria, Rockford, all of Mich.

[73] Assignee: Computer Design, Inc., Grand Rapids, Mich.

[21] Appl. No.: 870,588

[22] Filed: Apr. 17, 1992

Related U.S. Application Data

[63] Continuation-in-part of Ser. No. 243,616, Sep. 13, 1988, Pat. No. 5,107,444.

[51] Int. Cl.⁶ .............................................. G06F 15/72
[52] U.S. Cl. .................................................... 395/125
[58] Field of Search ............... 395/118, 119, 125, 155, 395/161; 340/728, 729, 747, 750; 345/118, 113, 117, 121

[56] References Cited

U.S. PATENT DOCUMENTS

| | | | |
|---|---|---|---|
| 3,534,396 | 10/1970 | Hart et al. | 235/61.6 |
| 3,614,410 | 10/1971 | Bailey | 235/186 |
| 3,636,328 | 1/1972 | Korelitz et al. | 235/151.1 |
| 3,653,071 | 3/1972 | Hill et al. | 444/1 |
| 3,693,168 | 9/1972 | Halkyard et al. | 340/172.5 |
| 3,716,705 | 2/1973 | Newell | 235/151 |
| 3,732,557 | 5/1973 | Evans et al. | 340/324 |
| 4,058,849 | 11/1977 | Fitzgerald | 364/520 |
| 4,070,710 | 1/1978 | Sukonick et al. | 366/900 |
| 4,546,434 | 10/1985 | Gioello | 364/300 |
| 4,775,946 | 10/1988 | Arjyo | 364/522 |
| 4,800,380 | 1/1989 | Lowenthal et al. | 340/750 |
| 4,825,391 | 4/1989 | Merz | 364/526 |
| 4,857,905 | 8/1989 | Ogawa | 340/748 |
| 5,107,444 | 4/1992 | Wu | 395/119 |
| 5,241,626 | 8/1993 | Taoda | 395/166 |
| 5,255,352 | 10/1993 | Falk | 395/125 |

OTHER PUBLICATIONS

Excerpt #1 from Rogers book, Procedural Elements for Computer Graphics, pp. 354–362, McGraw-Hill, 1985.

Cook & Oakes article "Mapping Methods for Generating 3–D Meshes," pp. 67–72 *Computers in Mechanical Engineering*, Aug. 1982.

Foley & VanDam article, "Fundamentals of Interactive Computer Graphics", Addison–Wesley Publishing Company, 1985.

"Mapping Methods for Generating Three-Dimensional Meshes" by W. A. Cook and W. R. Oakes from Computers in Mechanical Engineering/Aug. 1982/67–72.

Bennis, Chakib et al., "Piecewise Surface Flattening for (List continued on next page.)

*Primary Examiner*—Phu K. Nguyen
*Attorney, Agent, or Firm*—Price, Heneveld, Cooper, DeWitt & Litton

[57] ABSTRACT

A computer-assisted design apparatus and method for flattening a three-dimensional surface region to a two-dimensional shape in a flat plane or for wrapping a two-dimensional shape to a three-dimensional surface region. A mesh is grown on the surface to be wrapped or unwrapped. The polygonal elements of the mesh are mapped to a growing surface, which is independent of the three-dimensional surface. The growing surface is rotated and translated in order to position the polygonal elements on the two-dimensional surface, for unwrapping, or adjacent to the three-dimensional surface, for wrapping. For unwrapping and flattening, the mesh is grown on the three-dimensional surface region to be unwrapped and flattened independent of the surface boundaries of the parametric spline patch surfaces joined together to form the three-dimensional surface region. In this manner, the resulting mesh spans the mathematical definition of the corresponding surfaces. For wrapping, the polygonal elements are mapped to the three-dimensional surface region and assembled independent of the surface boundaries of the plurality of parametric spline patch surfaces joined together to form the three-dimensional surface region to which the two-dimensional shape is wrapped.

60 Claims, 41 Drawing Sheets

OTHER PUBLICATIONS

Non–Distorted Texture Mapping," *Computer Graphics,* vol. 25, No. 4, Jul., 1991, pp. 237–246.

Okabe, Hidehiko et al., "Paper Patterns of Dress for 3–Dimensional CAD/CAM and Their Automatical Division into Finite Elements," Sen–i Gakkaishi, vol. 42, No. 4, 1986, pp. 231–239.

Kahan, Scott D., "Real–Time Surface Manipulation Using the Triangulated Mesch," Iris Universe, pp. 24–30.

Thompson, Joe F. et al., "Numerical Grid Generation Foundation and Applications," pp. 414–416.

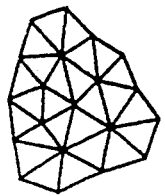
FIG. 6A
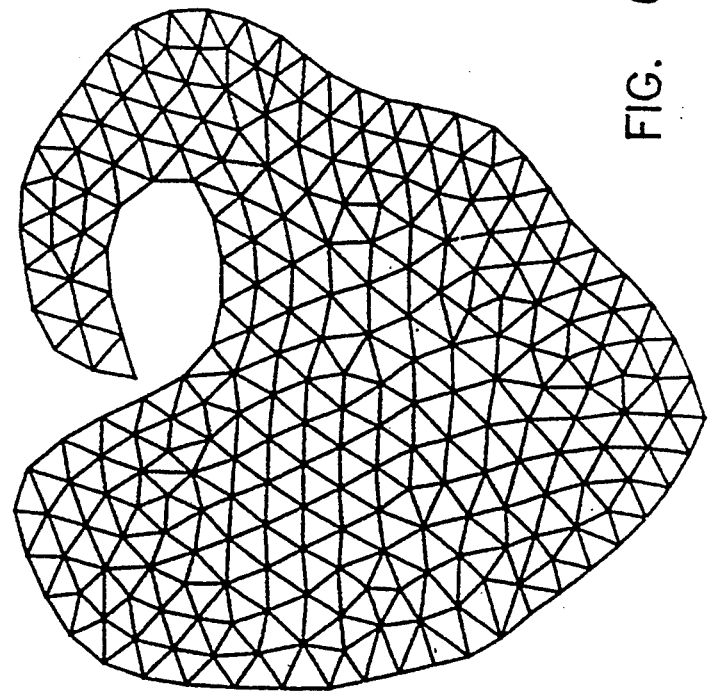
FIG. 6B
FIG. 6D
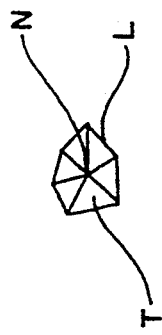
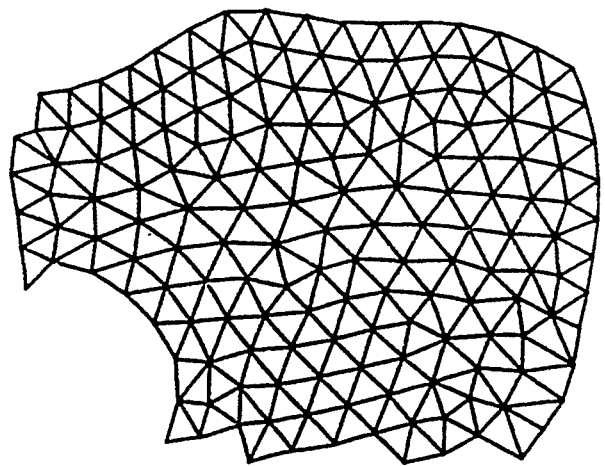
FIG. 6C

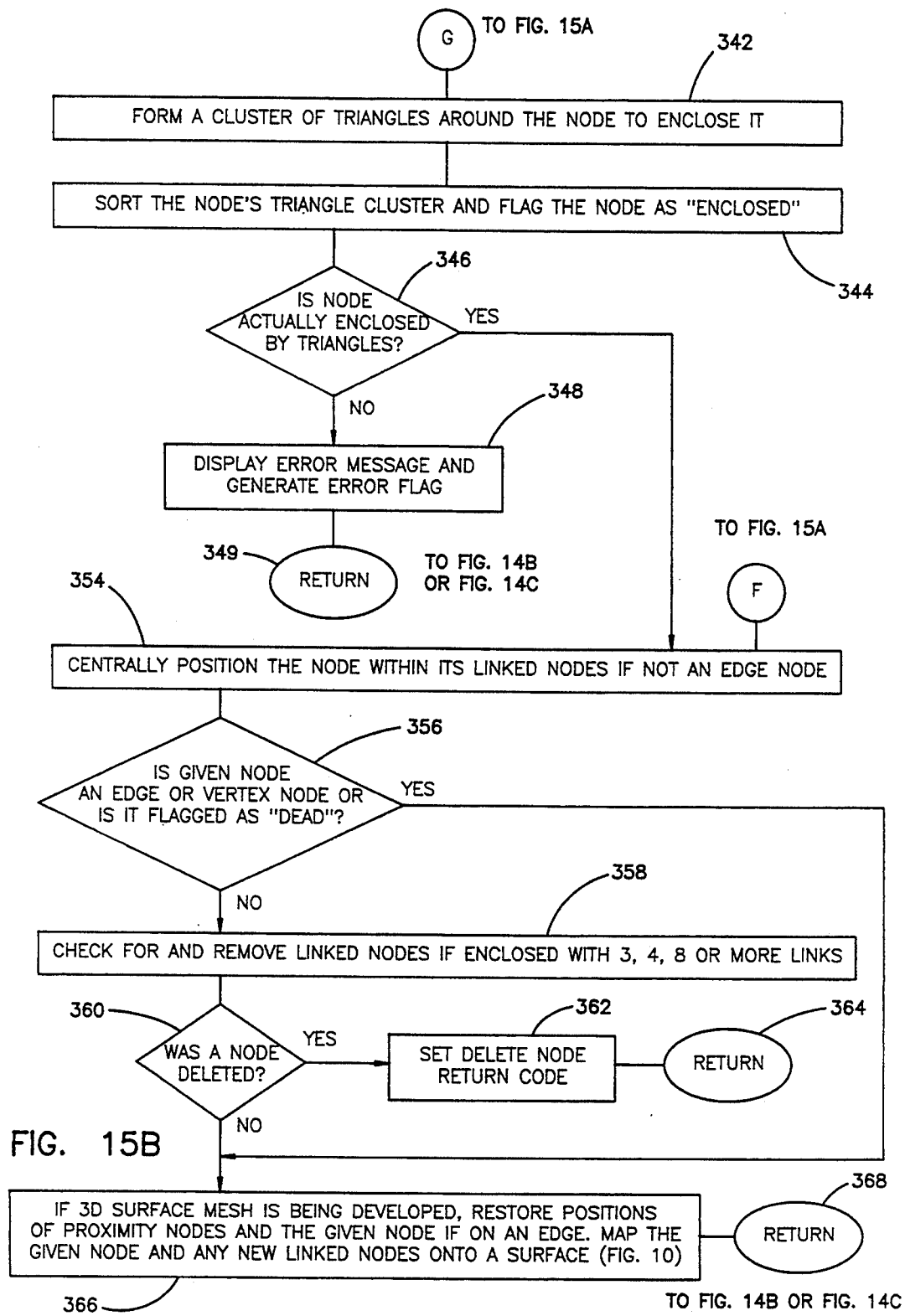

COMPUTER-ASSISTED DESIGN SYSTEM FOR FLATTENING A THREE-DIMENSIONAL SURFACE AND FOR WRAPPING A FLAT SHAPE TO A THREE-DIMENSIONAL SURFACE

CROSS REFERENCE TO RELATED APPLICATION

This application is a continuation-in-part of U.S. patent application Ser. No. 07/243,616 filed Sep. 23, 1988 by Chien Tai Wu for a METHOD AND APPARATUS FOR FLATTENING THREE-DIMENSIONAL SURFACES, now issued as U.S. Pat. No. 5,107,444.

BACKGROUND OF THE INVENTION

This invention relates to computer-assisted design (CAD) systems and specifically relates to a system and method for generating two-dimensional and three-dimensional surface meshes and for unwrapping and flattening three-dimensional surfaces into two-dimensional pattern shapes. The present invention has specific application to the footwear, furniture, automotive, aerospace and medical industries.

In U.S. Pat. No. 5,107,444 issued Apr. 21, 1992 to Chien Tai Wu for a METHOD AND APPARATUS FOR FLATTENING THREE-DIMENSIONAL SURFACES, the disclosure of which is hereby incorporated herein by reference, a unique solution was provided to the task of converting in a computer-assisted design system a three-dimensional image into a two-dimensional flat pattern that is a true representation of the three-dimensional surface of the object. For three-dimensional surfaces that possess regions having substantial amounts of Gaussian curvature, such as spheroidal surfaces and saddles, the flat pattern solution is not even developable in all regions. The Wu invention provided an optimum numerical solution that provided minimum deviation from the true solution to the flattening problem in regions of substantial amounts of Gaussian curvature. This is accomplished in a computer-assisted design system by generating a three-dimensional mesh conforming to the topology of the three-dimensional surface and including lines intersecting at nodal points to define polygonal elements between the nodal points. The polygonal elements were mapped to a location in a two-dimensional flat plane where the polygonal elements share at least one side with other polygonal elements previously mapped to the flat plane. The length of the shared side is distorted to conform to the length of the shared side of the other polygonal element. The distance between corresponding nodal points in the flat plane and on the three-dimensional surface are compared in order to determine the amount of distortion and are adjusted in response to the results of the comparison. This global adjustment is recursively carried out every time a complete row of elements is added to the developing pattern and when the pattern is complete.

Because the method of the Wu patent cannot be guaranteed to provide a true solution in regions of high Gaussian curvature, it additionally provides a function that compares the length of the sides of the polygonal elements in the three-dimensional image with the same sides in the two-dimensional image. If a side is shorter in the two-dimensional image, then localized "compression" exists and, if the side is longer, localized tension exists. Such determined compression and tension are displayed for each such polygonal element side by the use of a color bar displaying a range of hues which are displayed on the mesh element of the two-dimensional pattern shape. The Wu patent further provides tools by which the user may apply his or her creativity and experience to make modifications to the pattern piece. The modifications, or cuts, are mapped back to the three-dimensional surface, which is then reflattened in order to determine the effect of the user-initiated modifications on the tension and compression stress distribution.

In practical applications of three-dimensional CAD systems, it is conventional to model the surface of complex objects, such as automobile seats and medical prothesis implant covers by tiling many surfaces together to define the form of the object. For example, an automotive seat bottom, seat back or seat head rest is each typically defined by up to 10 or more different mathematical surfaces. Each surface combined in this manner has its own parameter space and mathematical definition. As a result, the boundaries of the mathematical surfaces do not necessarily define the particular surface region of a three-dimensional object for the purposes of unwrapping and flattening the three-dimensional object into a two-dimensional pattern shape. Where one or more of the surfaces that are tiled together to form the surface region of the three-dimensional object includes multiple nondevelopable adjacent surfaces, the ability to find an optimum solution is further complicated.

SUMMARY OF THE INVENTION

The present invention provides a unique method and system for growing a mesh conforming to the topology of a two-dimensional or three-dimensional surface and a method and system usable with the mesh generator for developing a two-dimensional shape that approximates a three-dimensional surface region mapped to a flat plane, using a computer-assisted design system. The invention is useful with surface regions defined by a plurality of parametric spline patch surfaces that are tiled together at surface boundaries.

According to one aspect of the invention, a regional mesh is grown on the three-dimensional surface region conforming to the topology of the surface region independent of the surface boundaries. In this manner, the mesh coincides with and spans the mathematical definition of the corresponding surfaces. The unwrapping and flattening may then be accomplished by mapping the polygonal elements to a flat plane and assembling the polygonal elements in a two-dimensional shape. Because the mesh is independent of the surface boundaries of the parametric spline patch surfaces, this aspect of the invention allows a surface region that is defined by a plurality of such surfaces to be flattened without altering the mathematical definition of the surfaces. This allows total freedom in the user specification of the boundary of the desired surface region over the existing surfaces through the use of surface curves. This aspect of the invention advantageously provides an optimum solution for the flattening of a surface region defined by a plurality of parametric surfaces having a high degree of Gaussian curvature in the surfaces such that an analytical solution to the development of a flat pattern corresponding to the surface region is not always possible.

According to another aspect of the invention, a mesh, including nodal points innerconnected by links in order to define polygonal elements between the links, is grown on a surface distinct from the mathematical definition of the parametric spline patch surfaces by locating added nodal points on a growing surface that is distinct from the parametric spline patch surface. The additional nodal points are normally dropped onto the respective spline patch surface such that they lie on the spline patch surface. In this manner, a link may connect two nodes that lie on two separate but adjacent mathematical surfaces. Additionally, the two adjacent surfaces do not have to touch because the mapping will put the node on the edge of the closest surface. In a most preferred form, the polygonal elements are triangular and are grown on a plane that is tangent to a particular existing nodal point. Existing nodal points are enclosed on the growing surface with triangles in order to define additional nodal points. In order to ensure that additional nodal points are dropped onto the proper parametric spline patch surface in the vicinity of tangential discontinuity, volume elements are defined for each such surface using a conventional grid mesh. A determination is made of which of the volume elements the particular nodal point is in.

According to another aspect of the invention, a mesh is grown on a surface region conforming to the topology of the surface region by growing a ribbon of polygonal elements conforming to the topology of the surface region along edges defined with respect to the region. Interior polygonal elements that conform to the topology of the surface region are grown to the edge ribbons until the polygonal elements substantially cover the surface region. In order to develop a two-dimensional shape that approximates the three-dimensional surface region, the polygonal elements are mapped to a flat plane in a manner that additional polygonal elements share at least one nodal point with previously mapped polygonal elements and are positioned in ring portions that are generally concentric with the initially mapped polygonal elements. The initially mapped polygonal element may be selected by the user or may be defined by default as the last polygonal element enclosed in the mesh.

According to another aspect of the invention a three-dimensional surface, that is covered with a triangular mesh conforming to the topology of the surface, is unwrapped and flattened by projecting mesh nodal points from the three-dimensional surface to a local tangent surface in the vicinity of an existing nodal point. The local tangent surface is then rotated and translated to coincide with a flat plane. If a two-dimensional surface is to be wrapped on a three-dimensional surface, the procedure is essentially reversed with the nodal points being dropped from the local tangent surface onto the three-dimensional surface.

The invention further comprehends the providing of tools for the user to assist in the growing of a mesh and the unwrapping and flattening of a three-dimensional surface. Tools are provided to allow the user to select surface edges and vertices that are to be mesh disconnections or cuts. Conversely, adjacent edges that define discontinuities in the surface region may be seamed together to form a unified mesh. The user may select, either before or after the development of a flat pattern, regions of the mesh that are to be cut out. A settling function may be selected by the user in order to recursively compare link lengths of a mesh and to displace nodes in order to provide a more uniform mesh.

Although the invention is described in relation to development of meshes conforming to the topology of three-dimensional surfaces, the principles find application to two-dimensional meshes. Additionally, the principles described in relation to the unwrapping of a three-dimensional surface that is mapped to a two-dimensional plane may find application to a two-dimensional surface that is mapped to a three-dimensional space and wrapped on an object.

These and other objects, advantages and features of this invention will become apparent upon review of the following specification in conjunction with the drawings.

BRIEF DESCRIPTION OF THE DRAWINGS

FIG. 6a illustrates an initial node and surrounding cluster of triangular elements mapped to an (x,y) flat plane at the beginning of the development of the two-dimensional regional mesh;

FIG. 6b illustrates a layer or ring of triangular elements being assembled onto the initial cluster of triangular elements the (x,y) plane;

FIG. 6c illustrates further development of the mesh in the (x,y) plane;

FIG. 6d illustrates a completed two-dimensional regional mesh in the (x,y) plane developed from the three-dimensional surface mesh in FIGS. 5a–5d;

FIG. 7d illustrates a completed surface region mesh on the sphere of FIG. 7a;

Figure 7B:
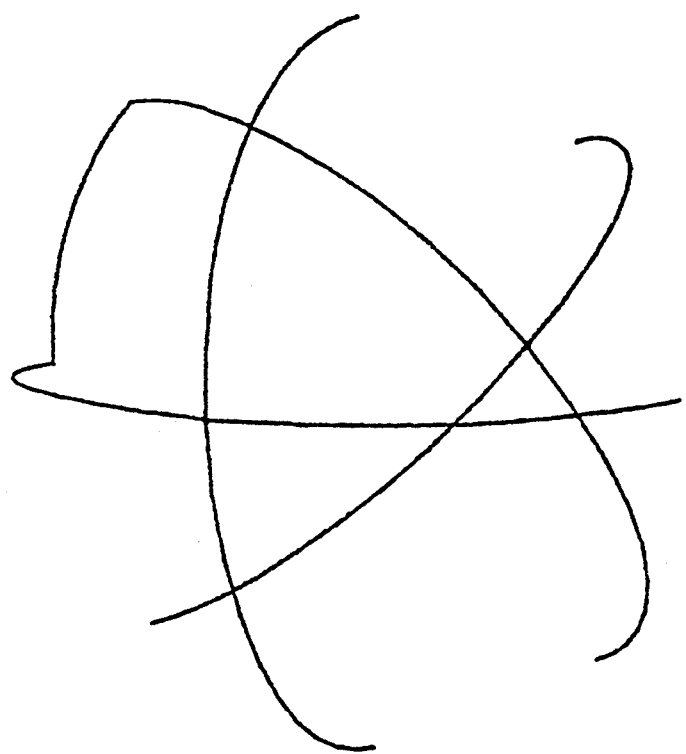
FIG. 7b illustrates surface region edge and vertex features on the sphere in FIG. 7a according to the invention.
Figure 7A:
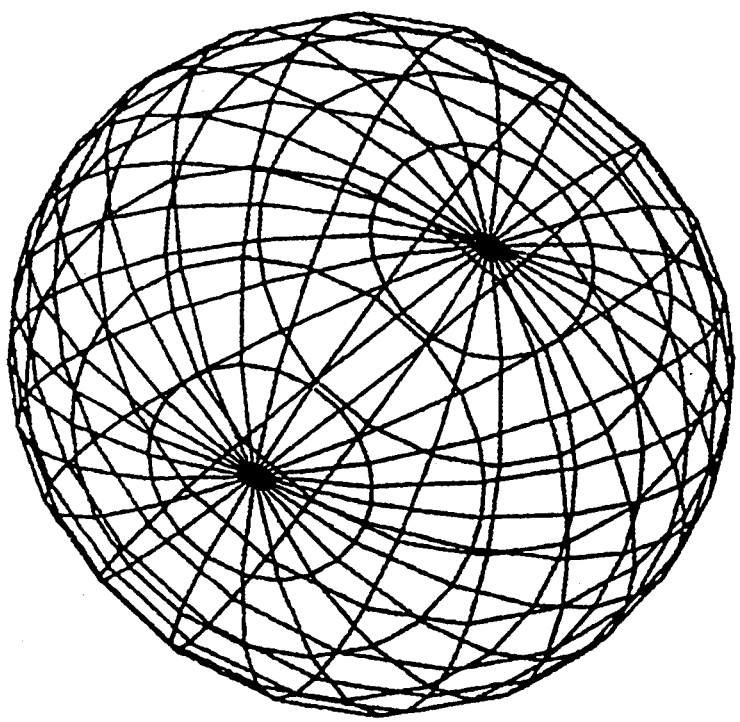
FIG. 7a illustrates an orthographic view of a single mathematical sphere surface displayed using a standard quadrilateral mesh that converges at each pole.
Figure 7D:
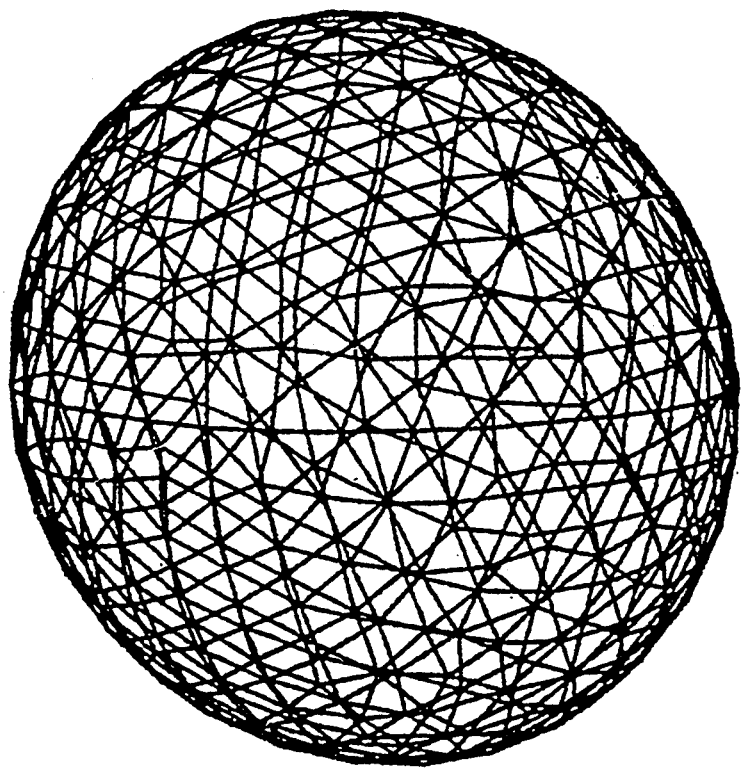
Figure 7C:
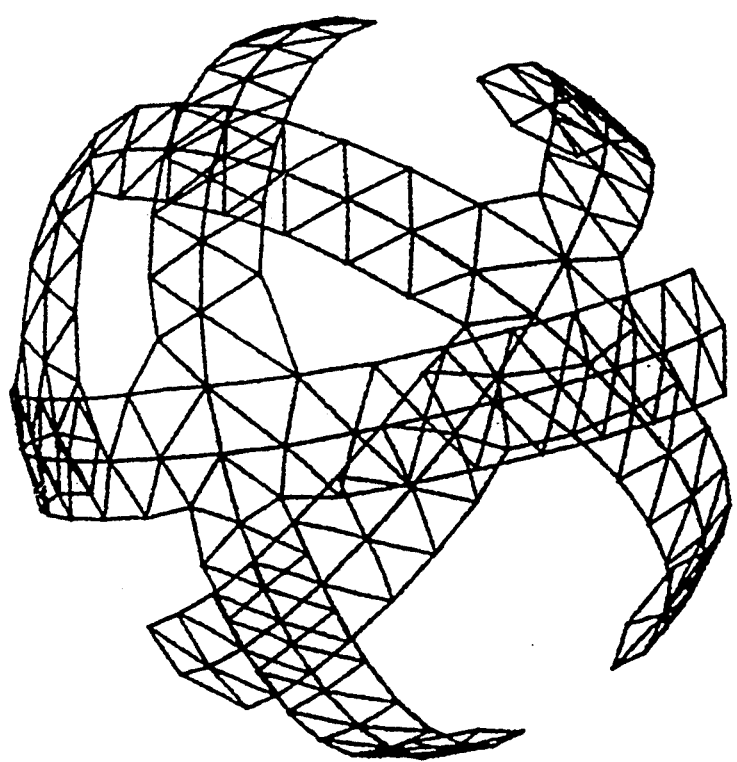
FIG. 7c illustrates the edge and vertices of FIG. 7b being enclosed by triangular elements.
Figure 7G:
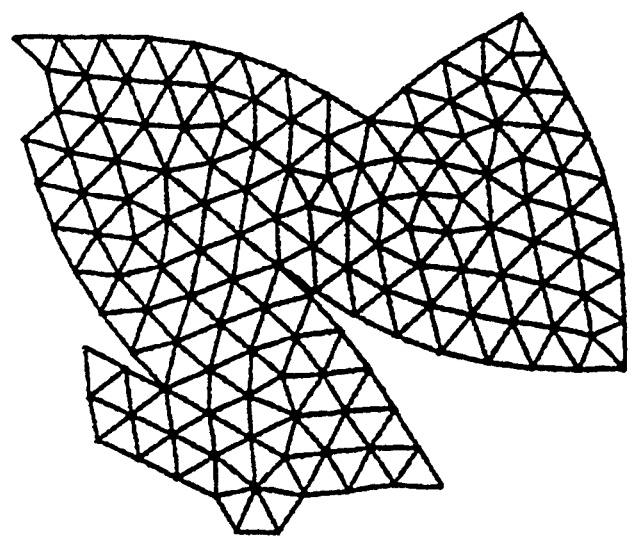
Figure 7F:
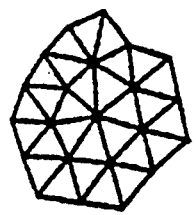
Figure 7E:
FIG. 7e illustrates an initial node and its enclosing cluster of triangular elements mapped to a flat (x,y)
Figure 7H:
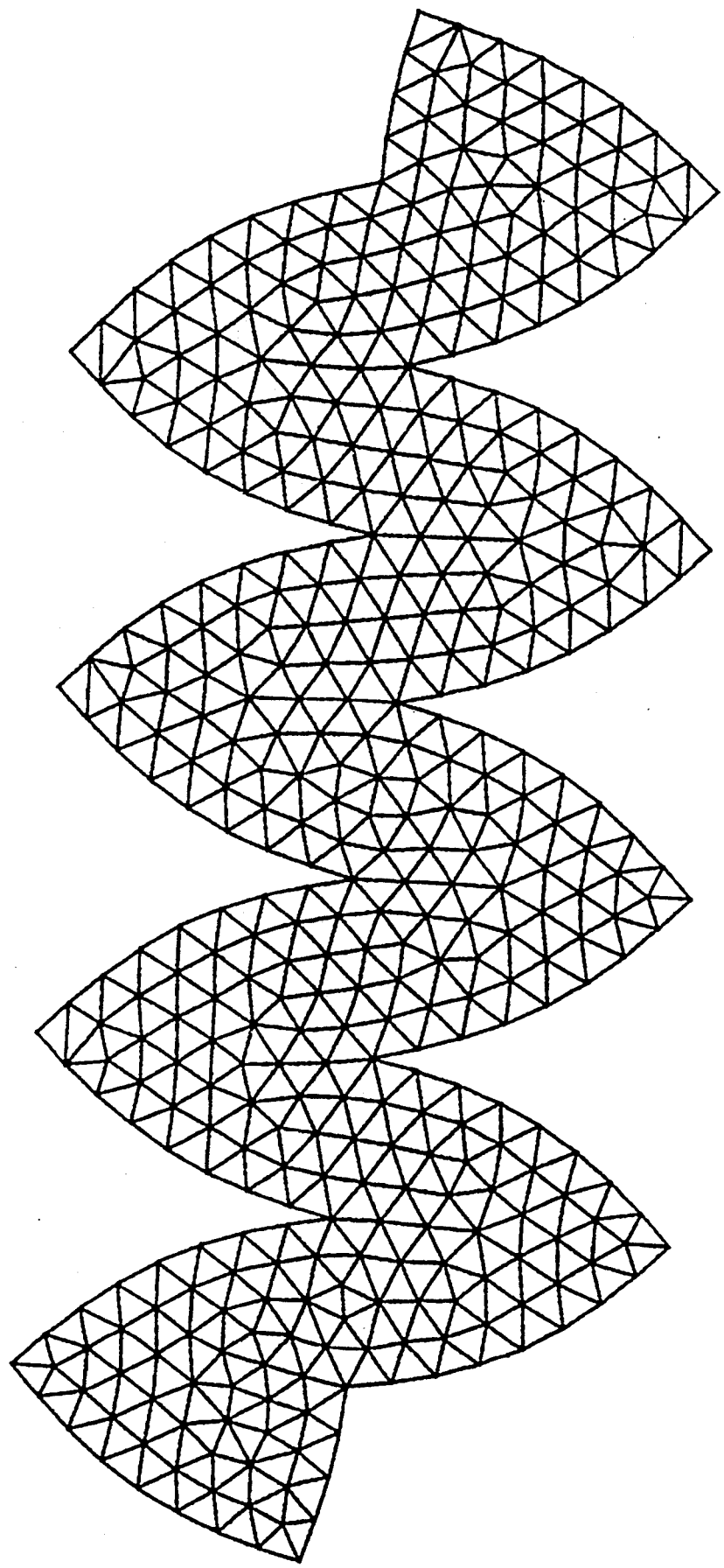
Figure 8:
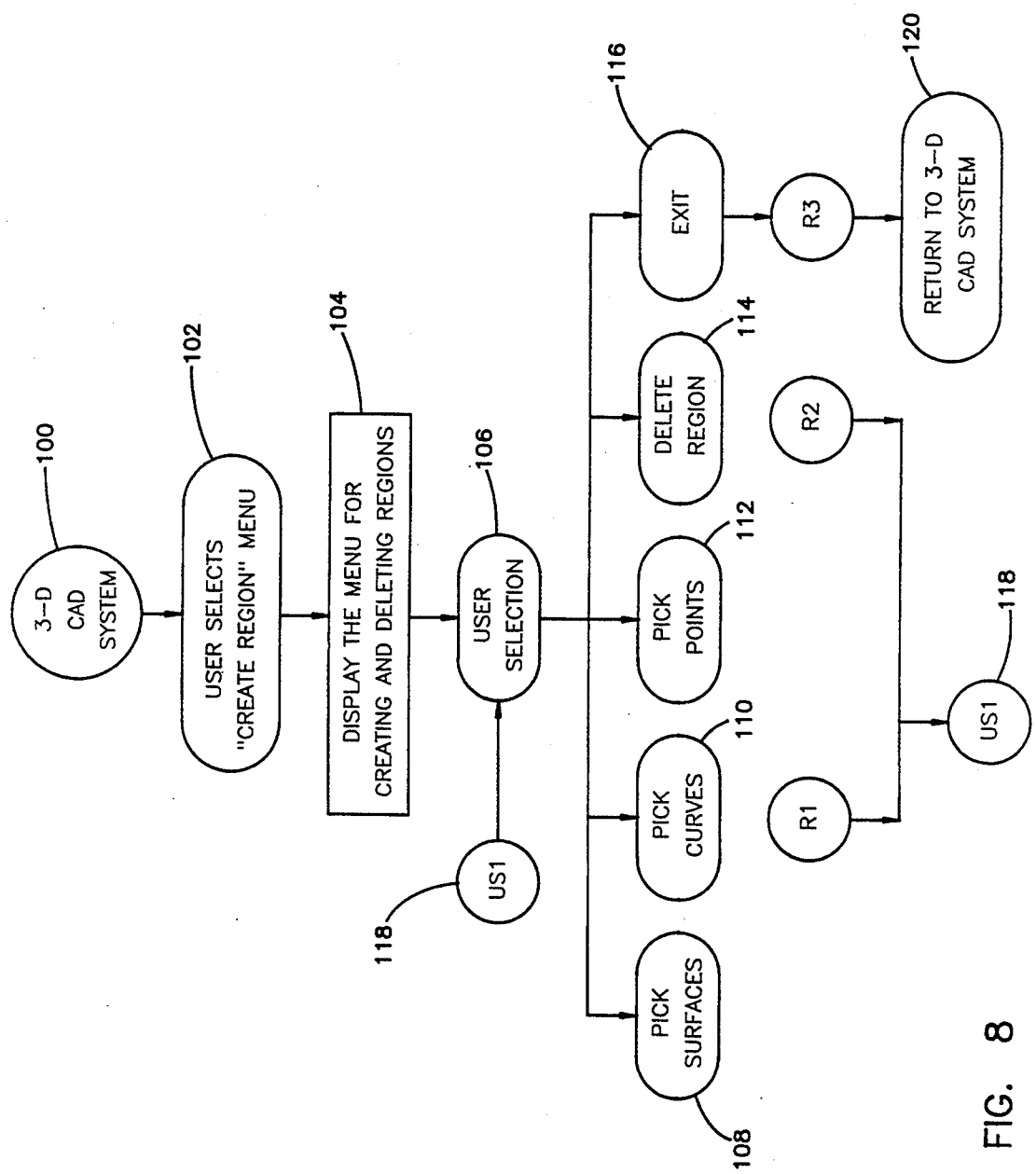
Figure 9:
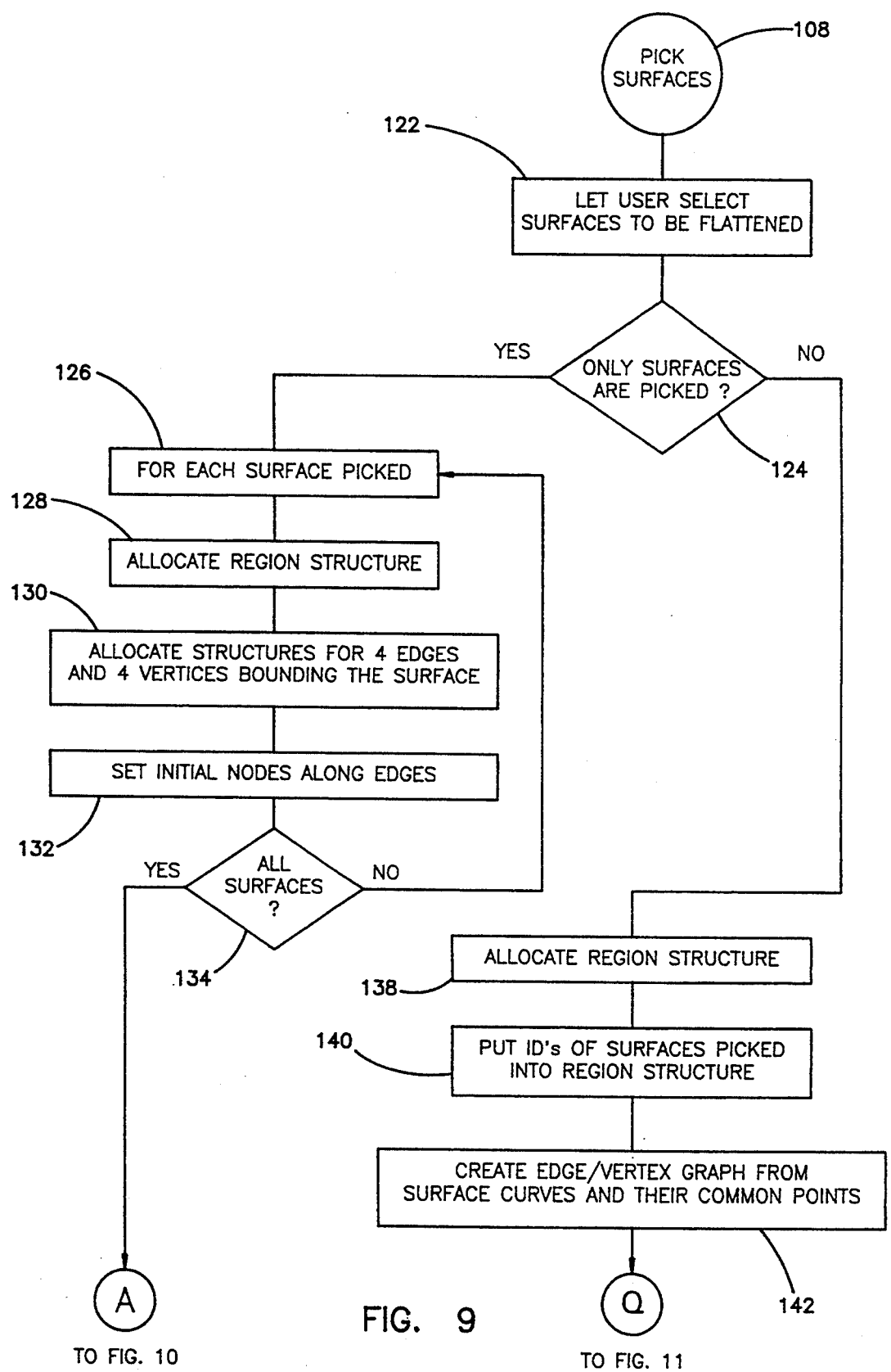
Figure 10:
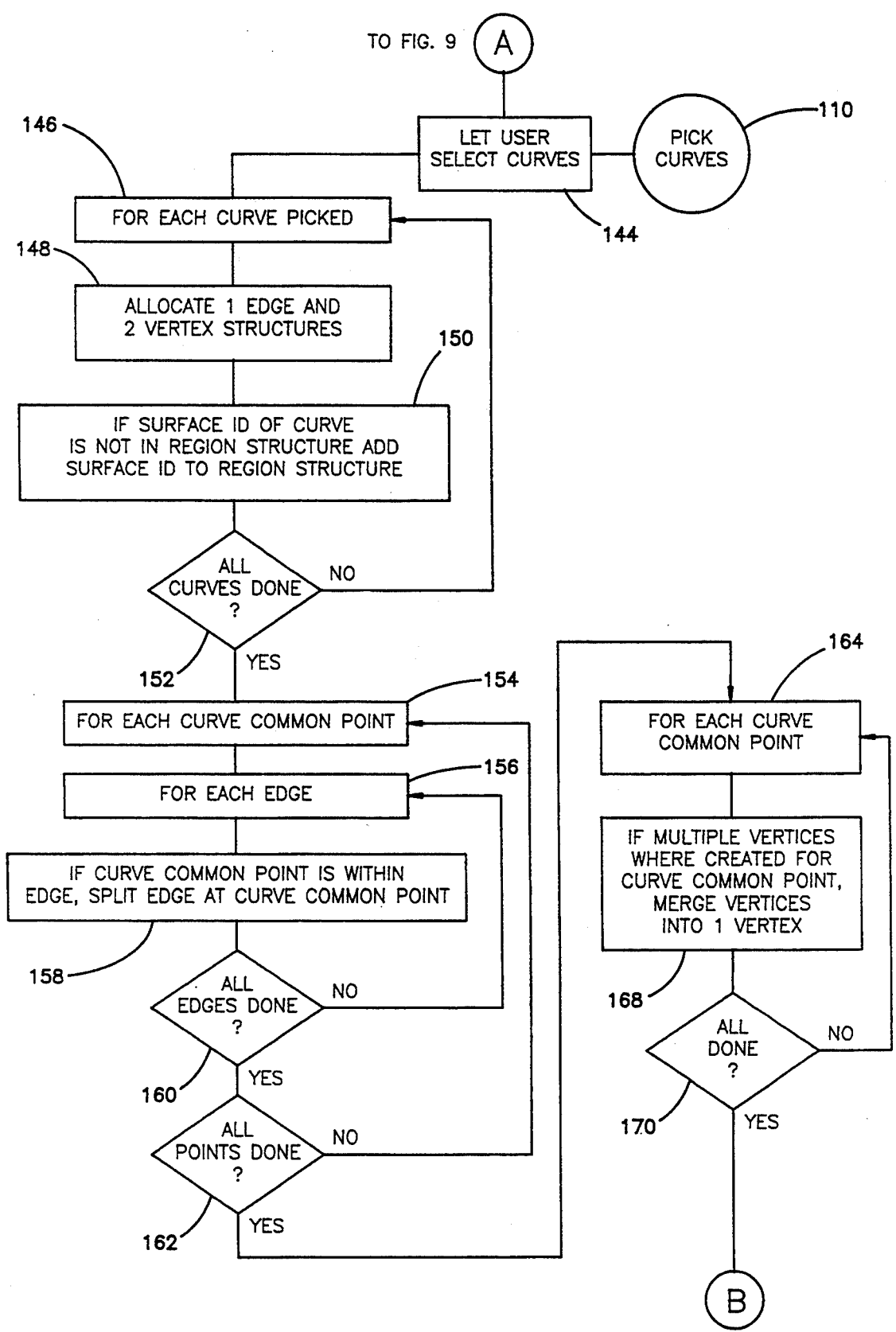
Figure 11:
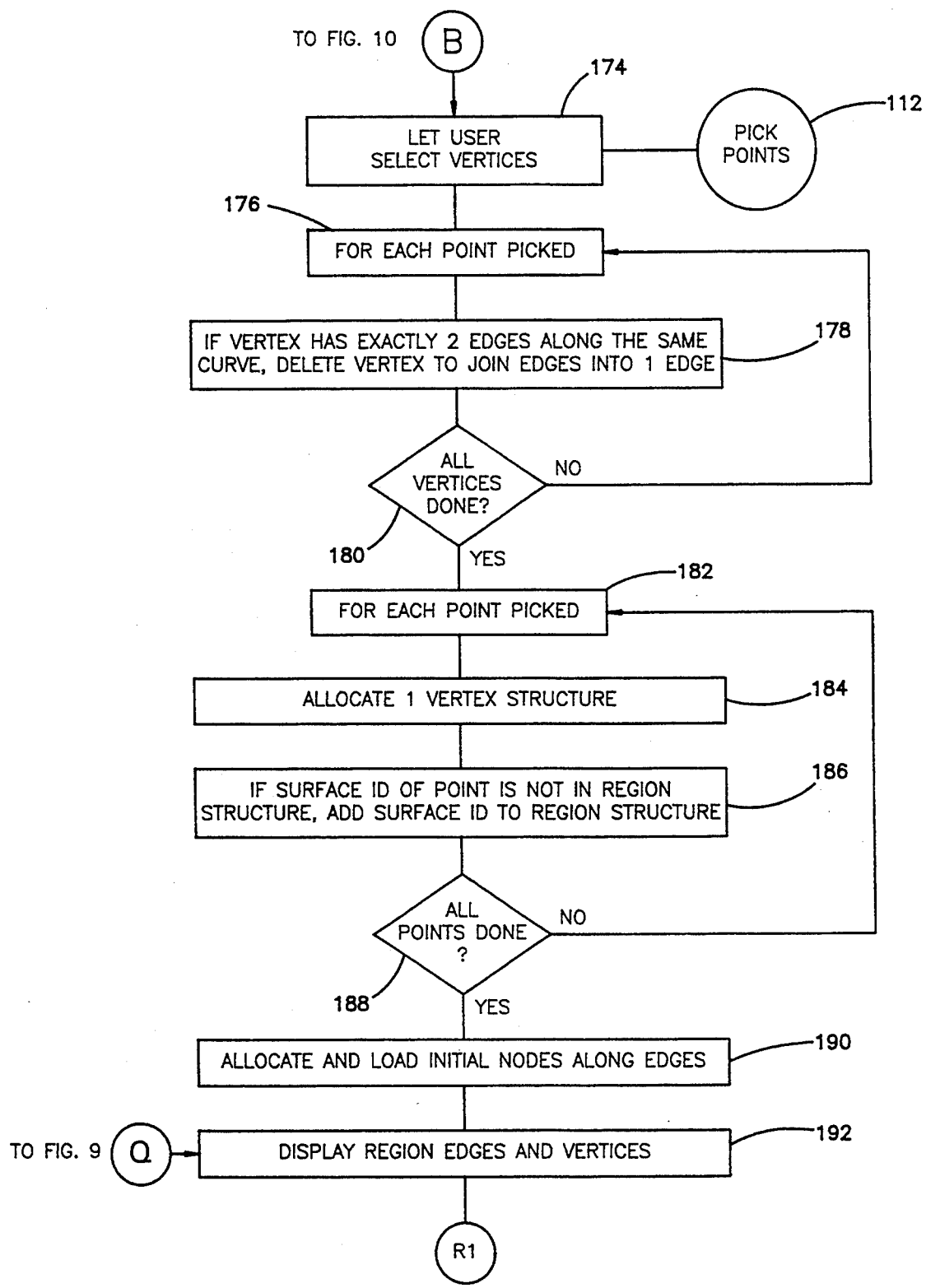
Figure 12:
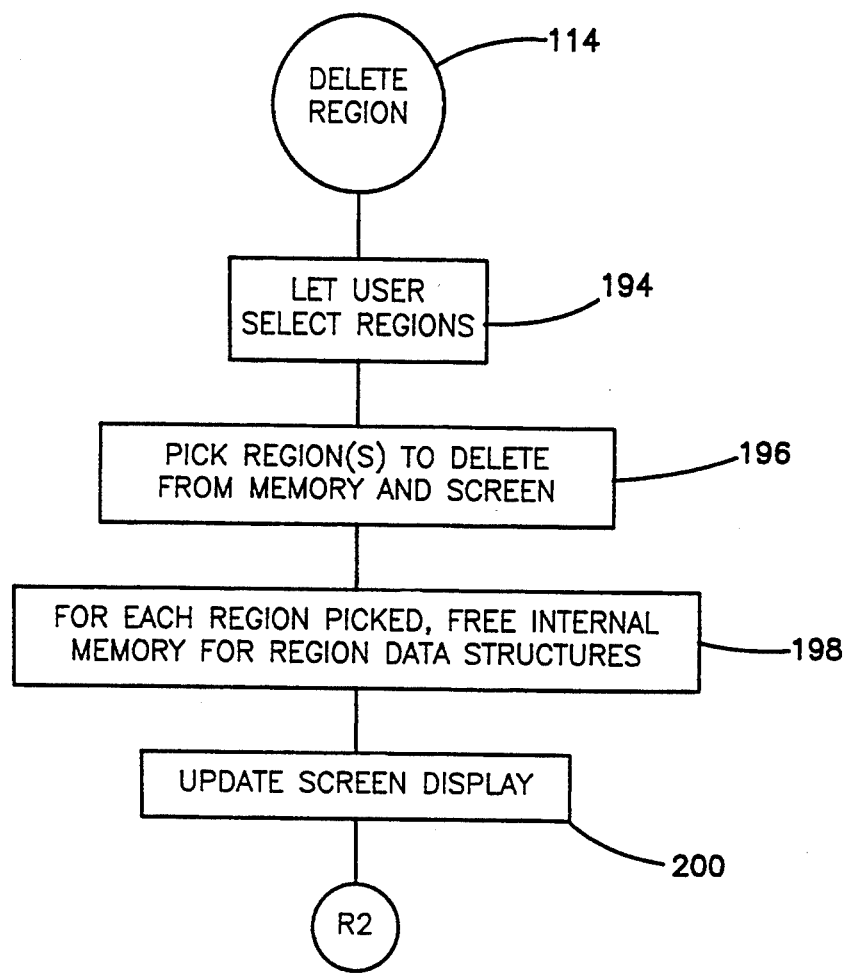
Figure 13:
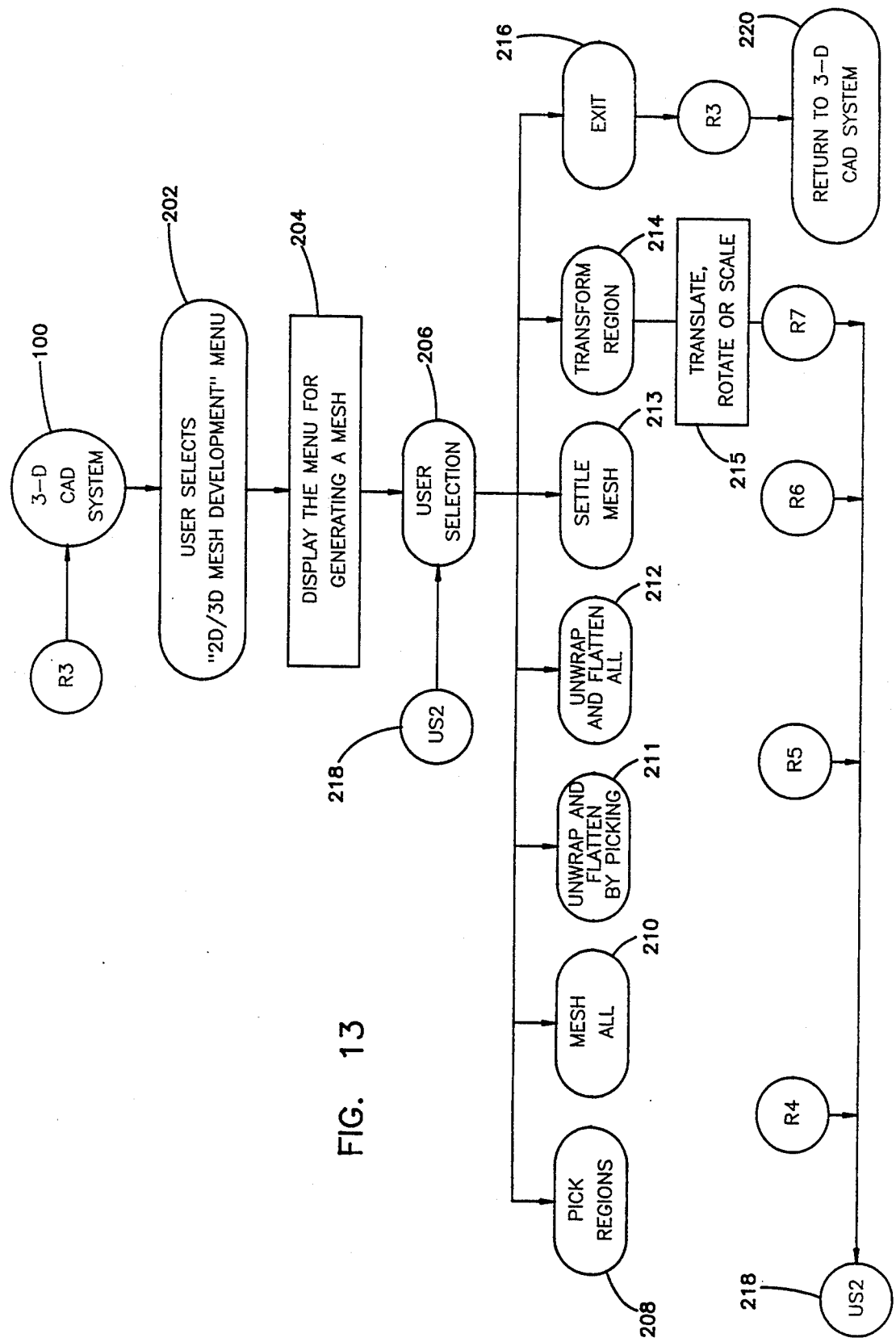
Figure 14A:
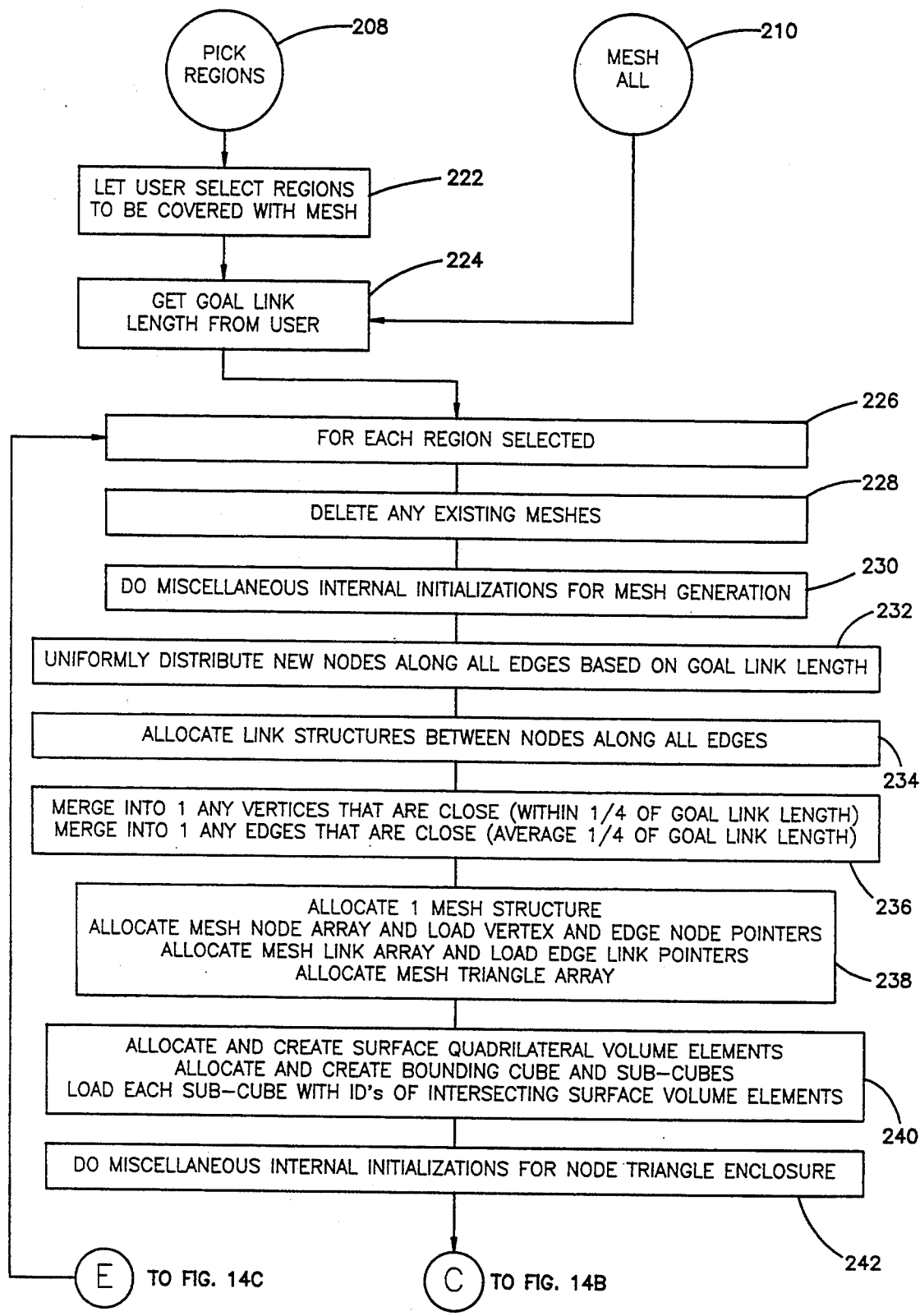
Figure 14B:
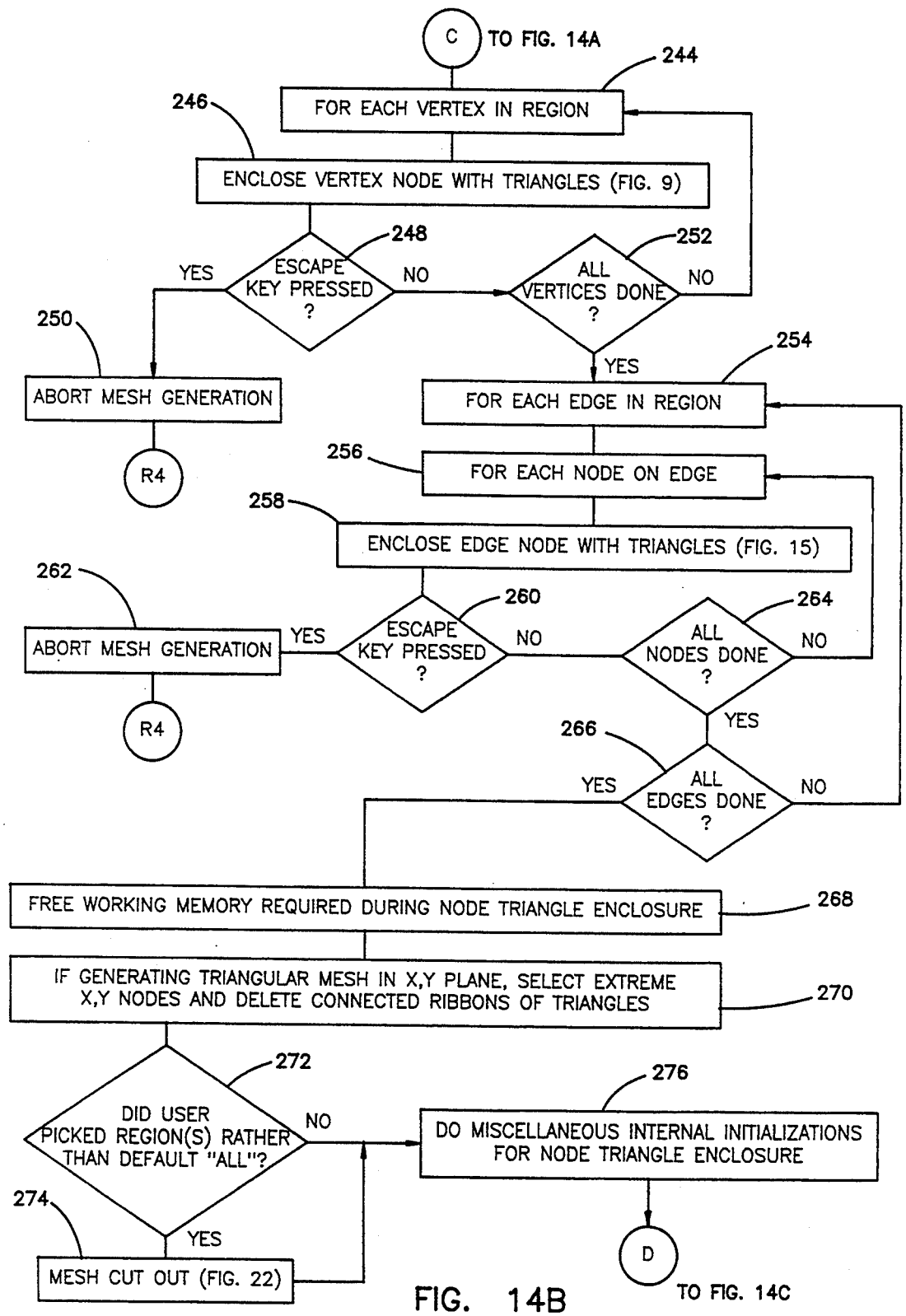
Figure 14C:
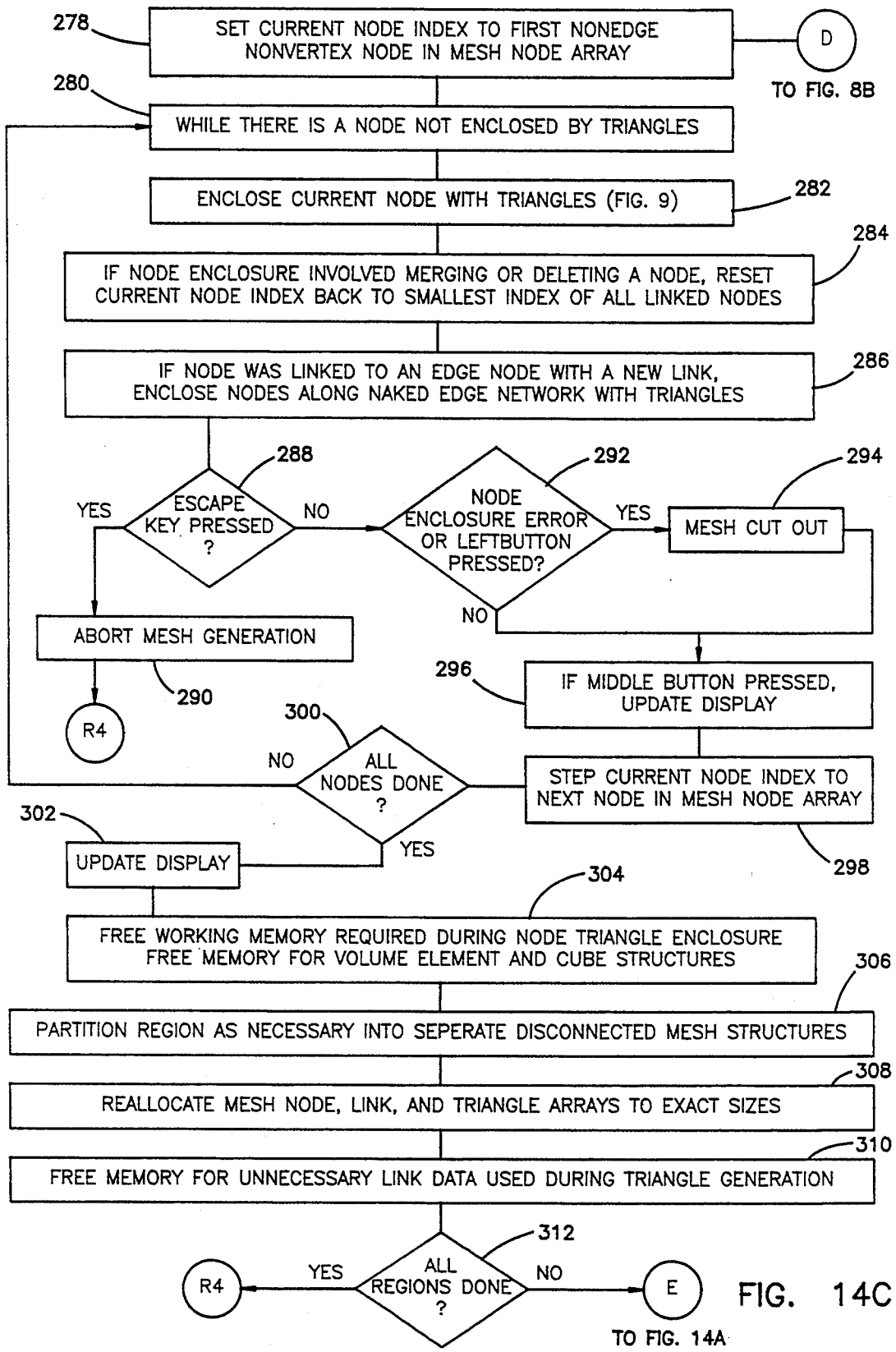
Figure 15A:
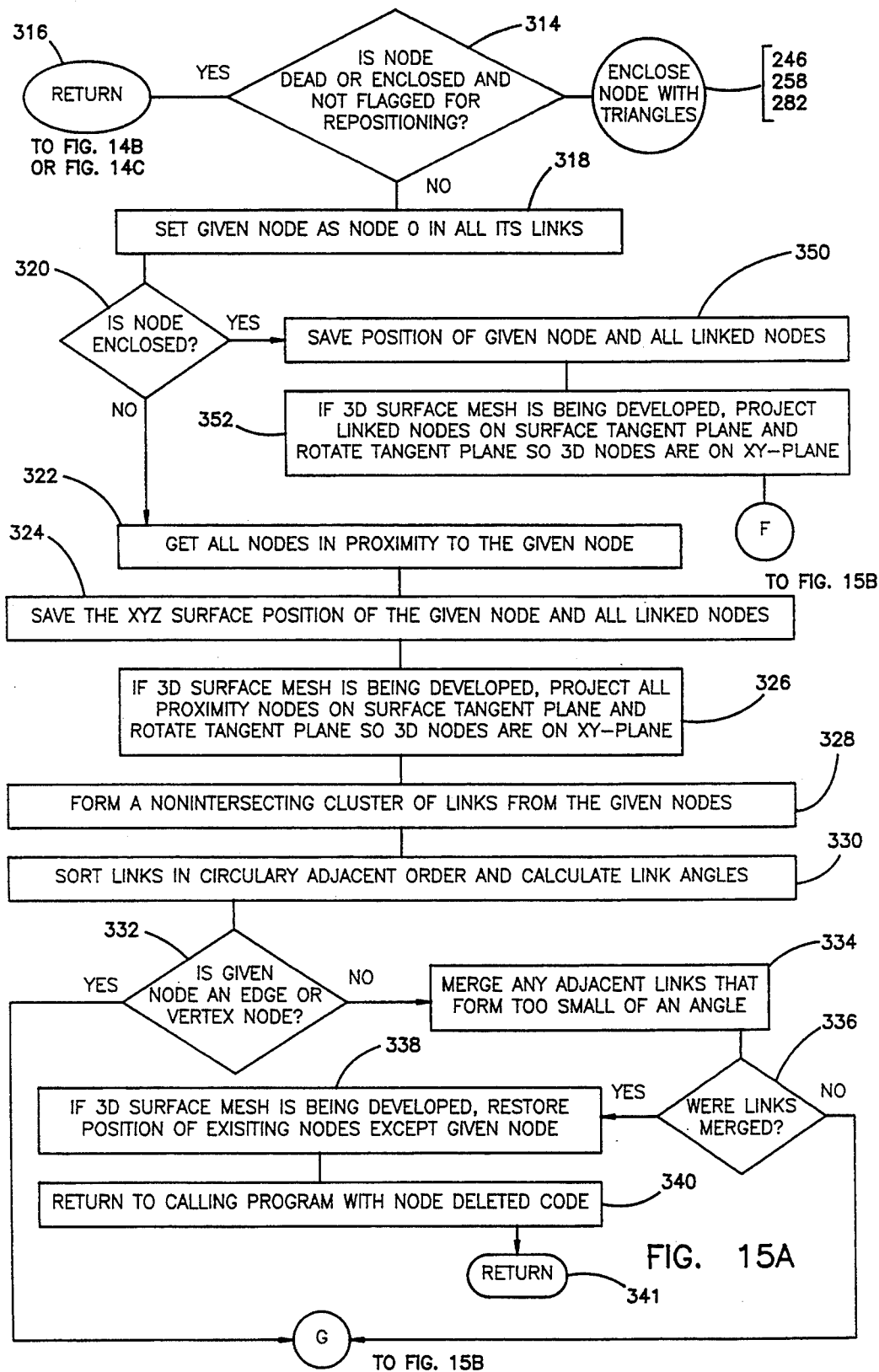
Figure 16:
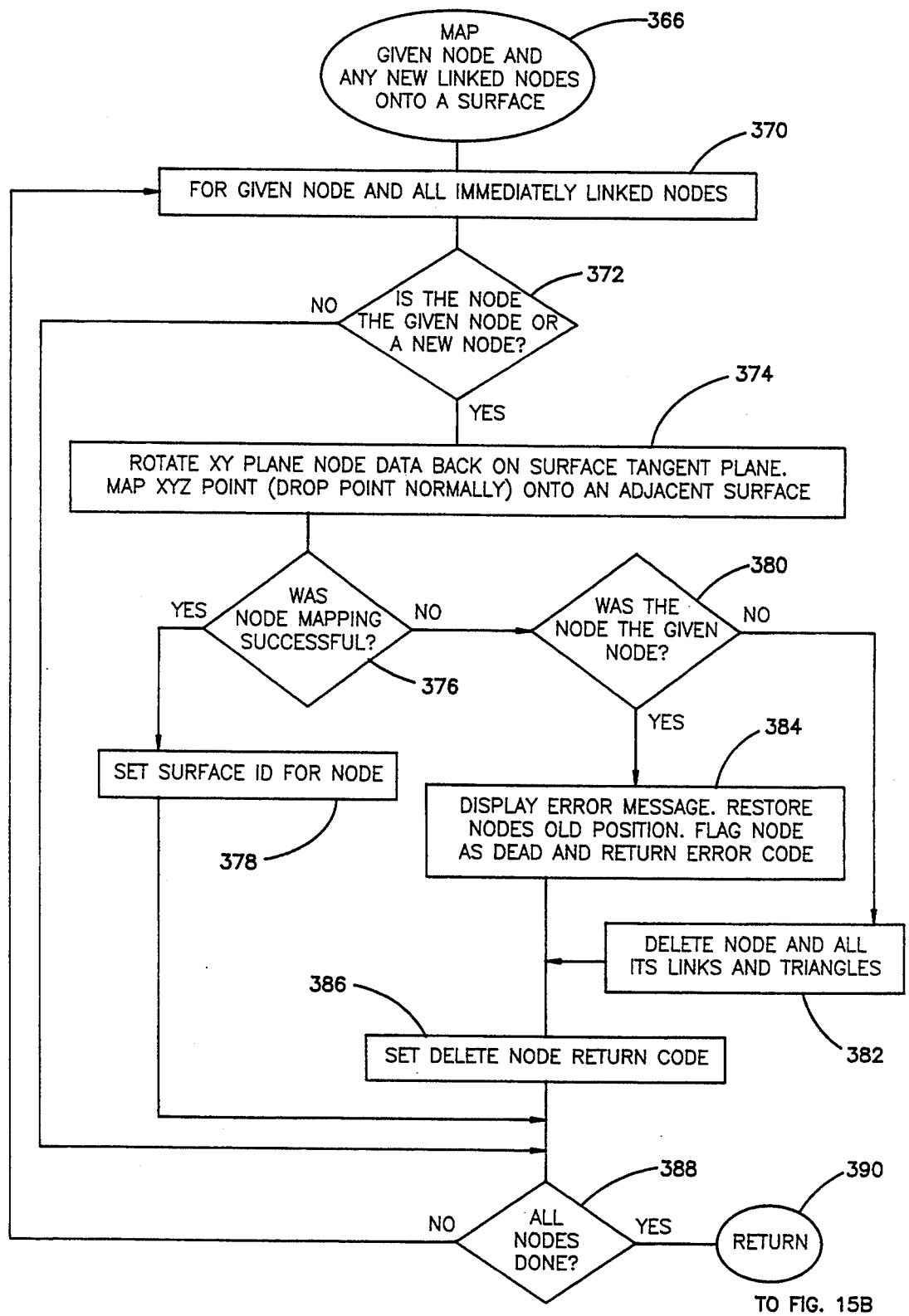
Figure 17A:
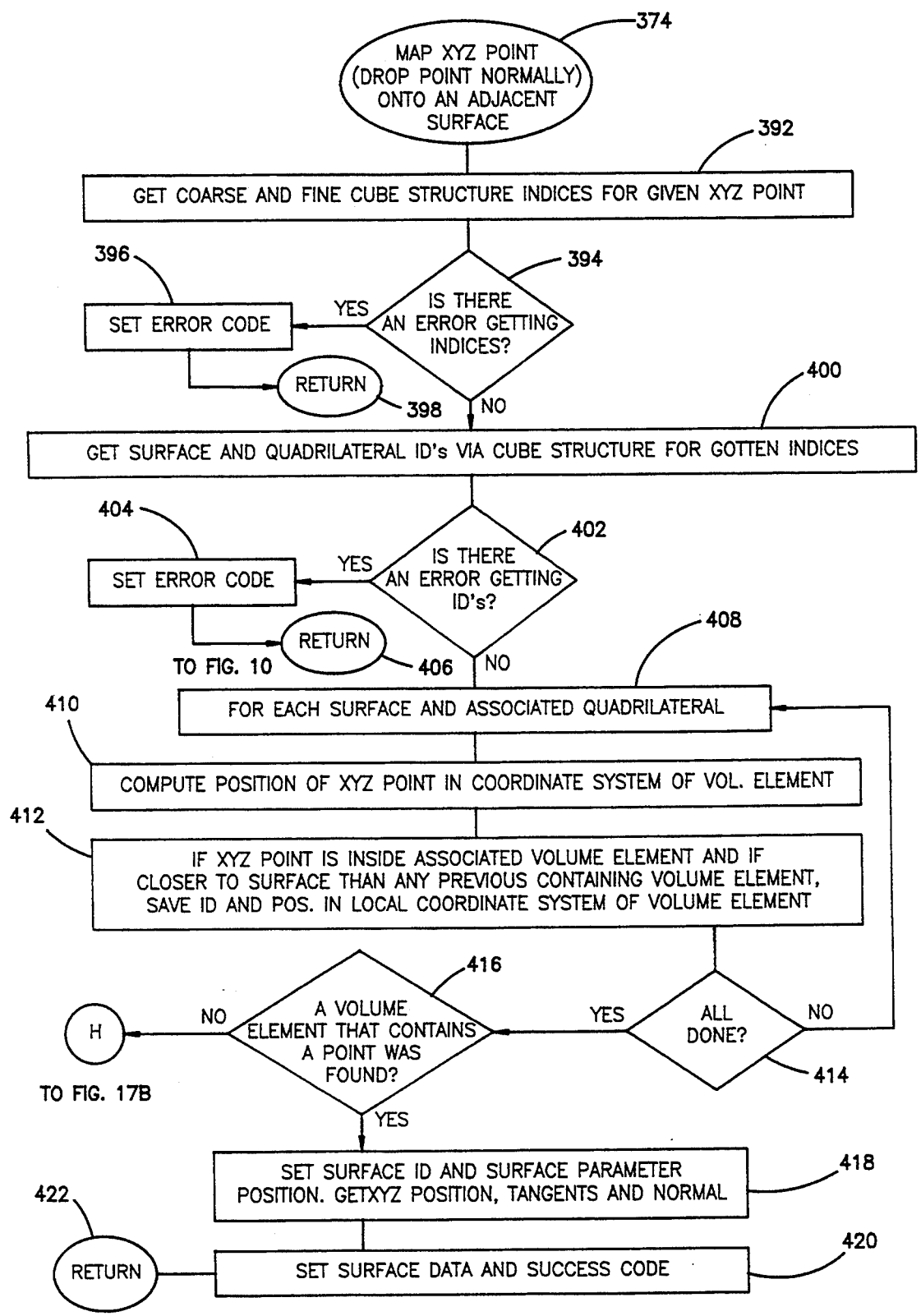
Figure 17B:
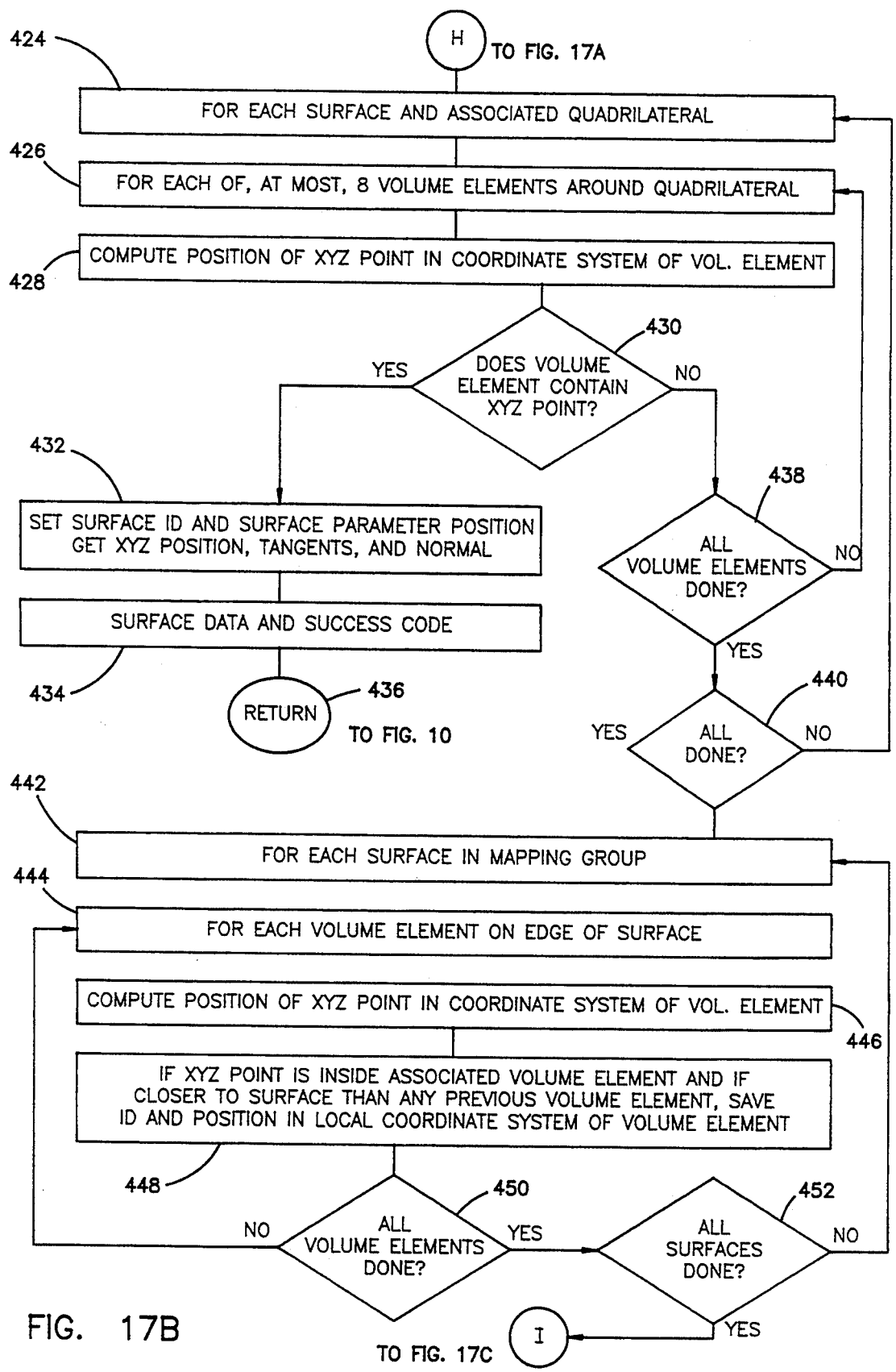
Figure 17C:
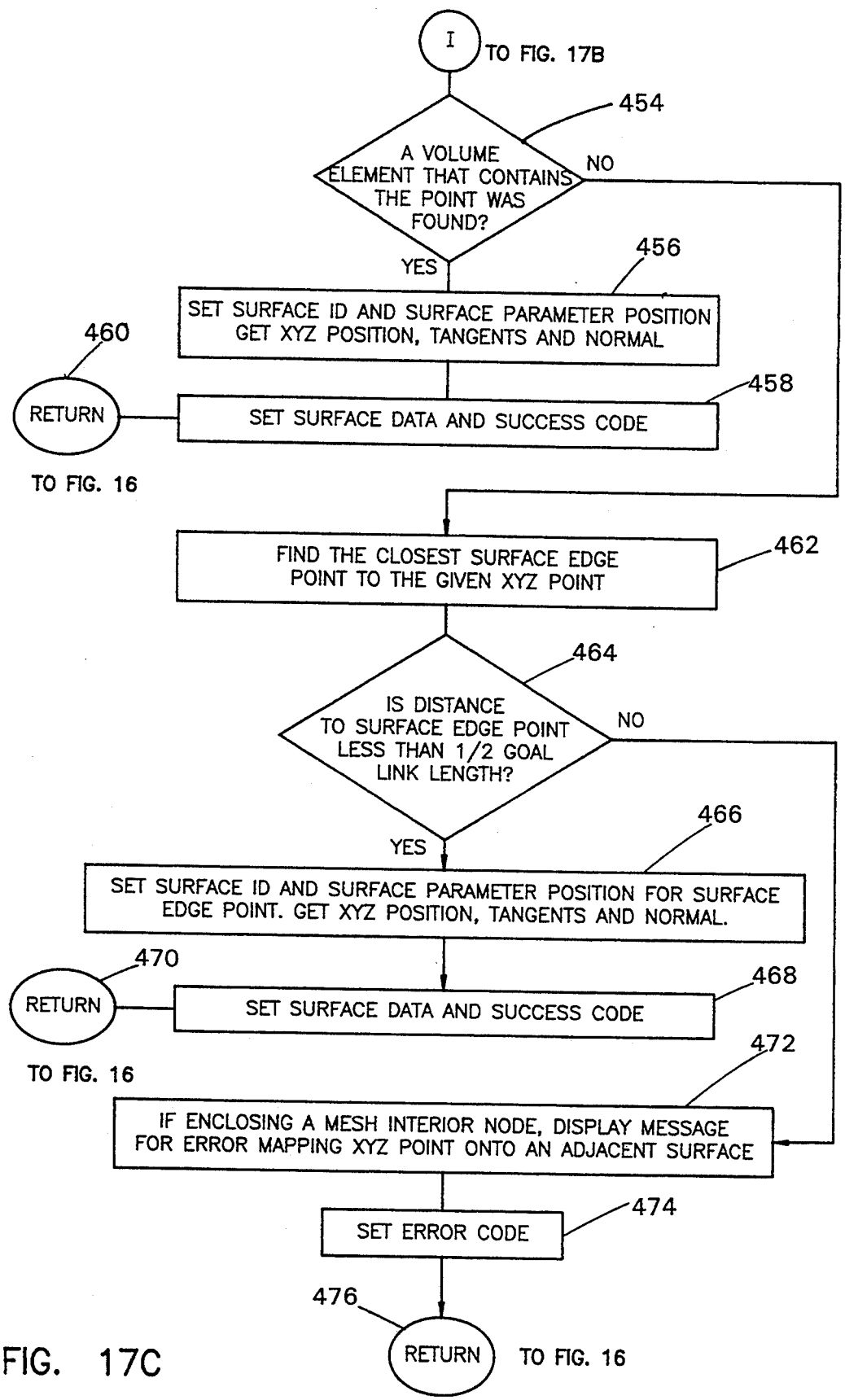
Figure 18A:
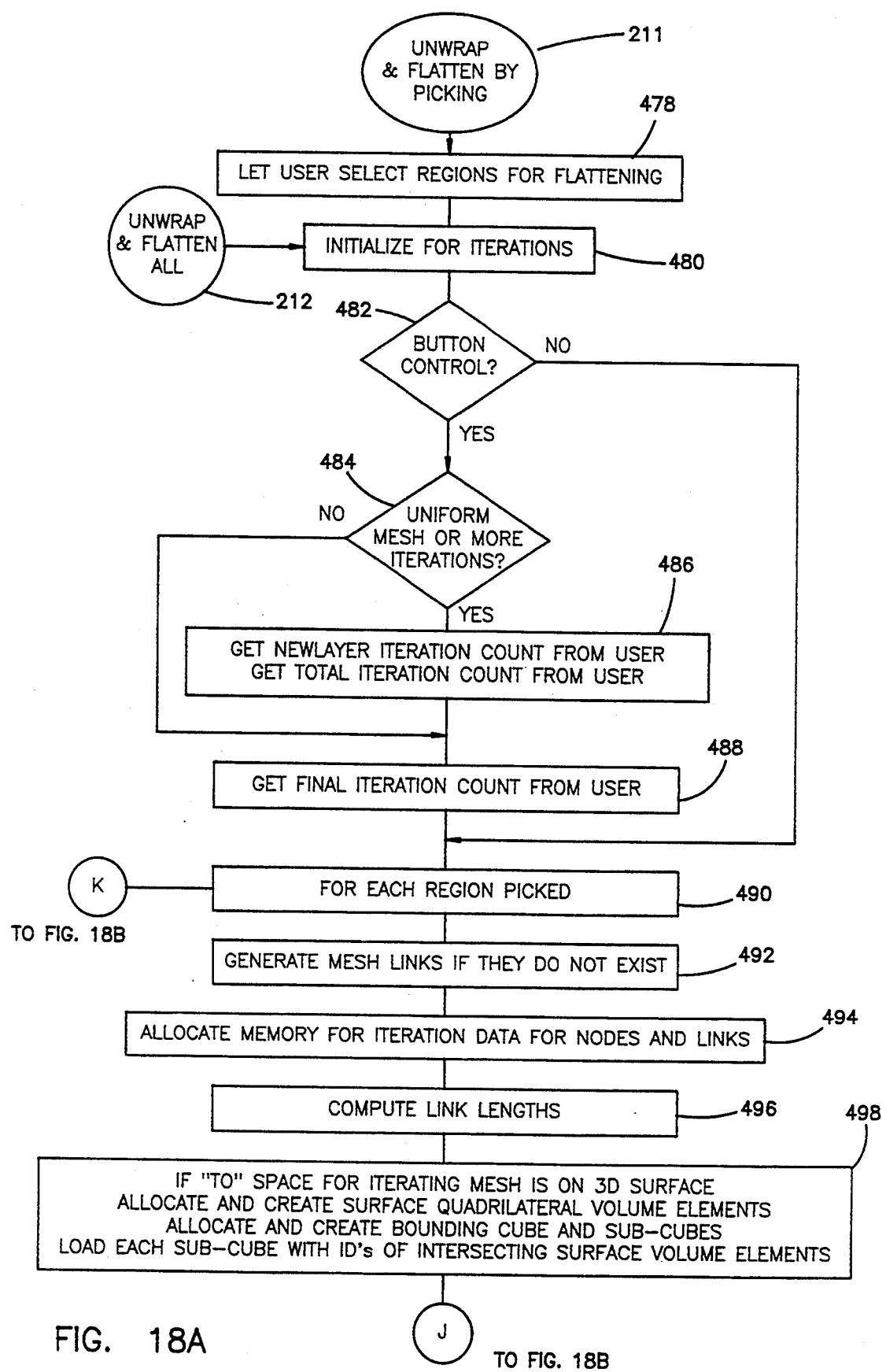
Figure 18B:
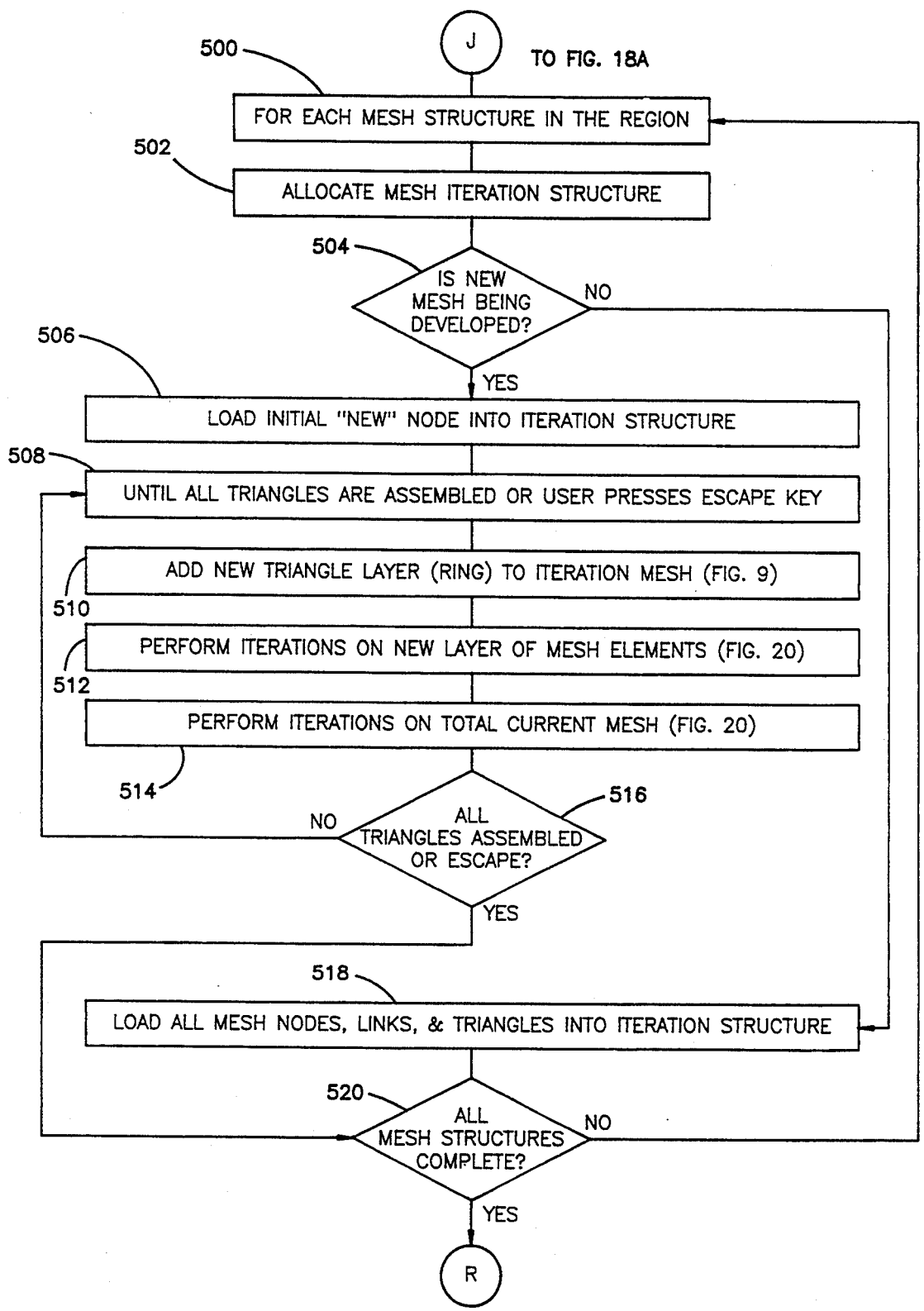
Figure 18C:
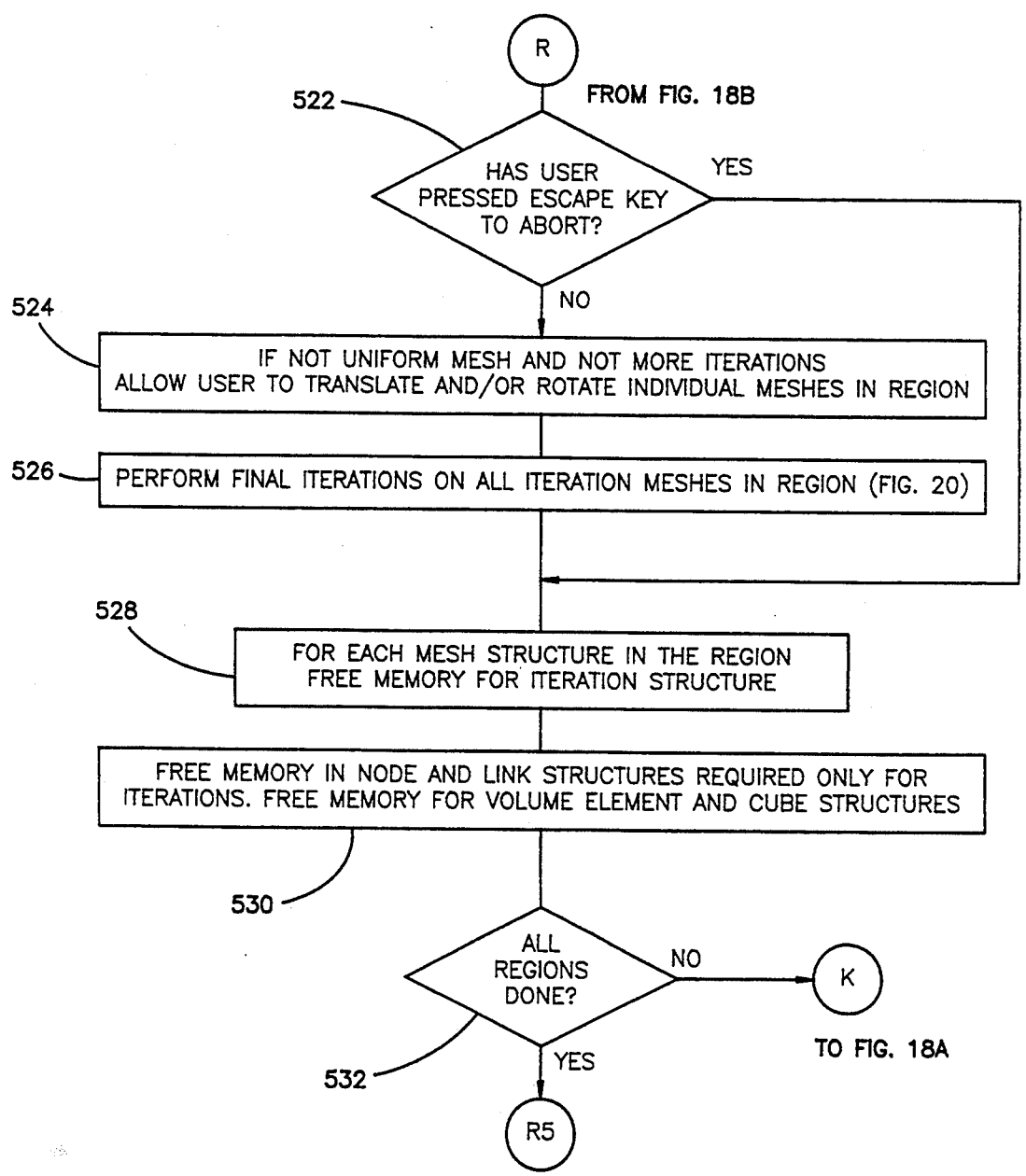
Figure 19:
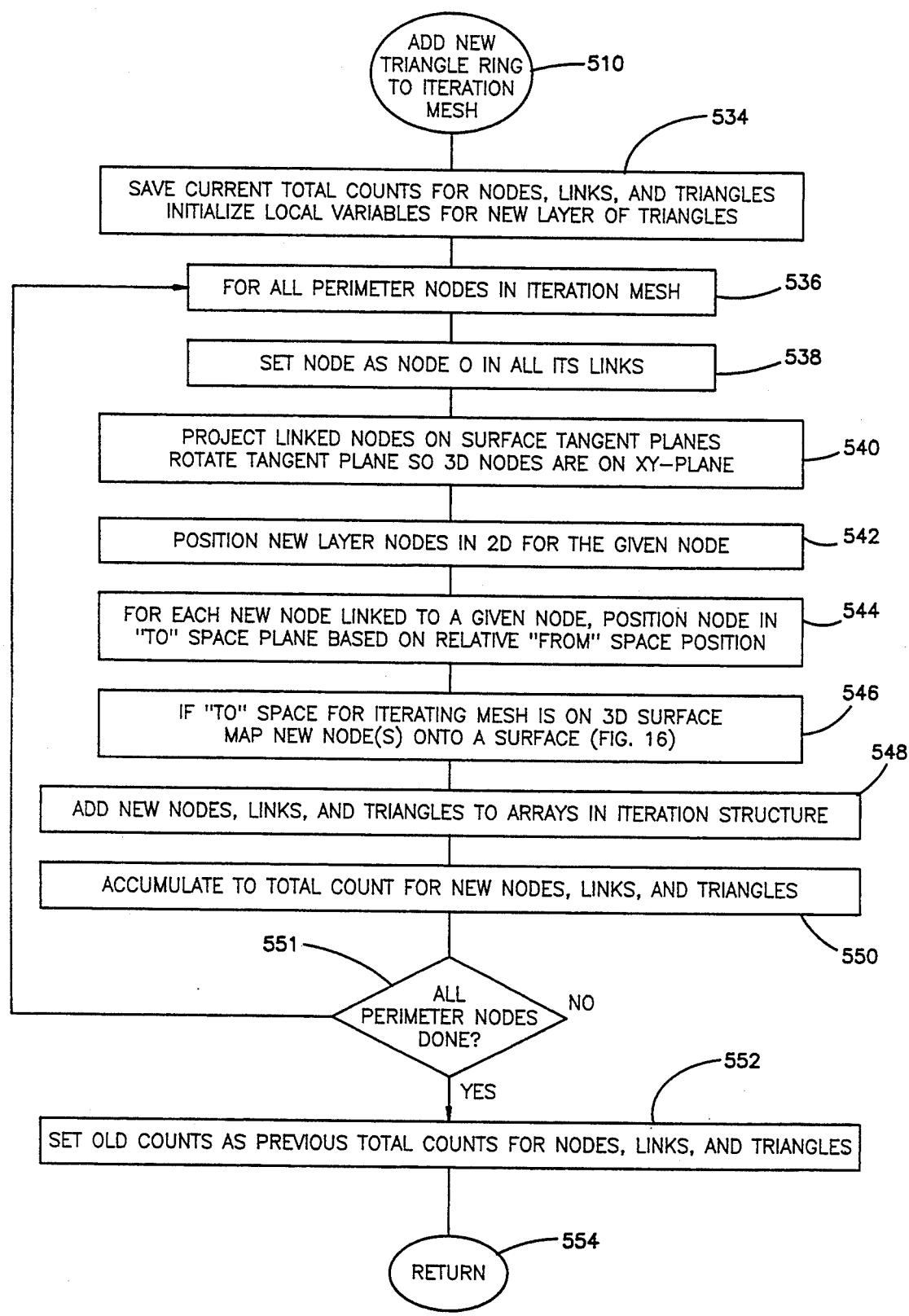
Figure 20A:
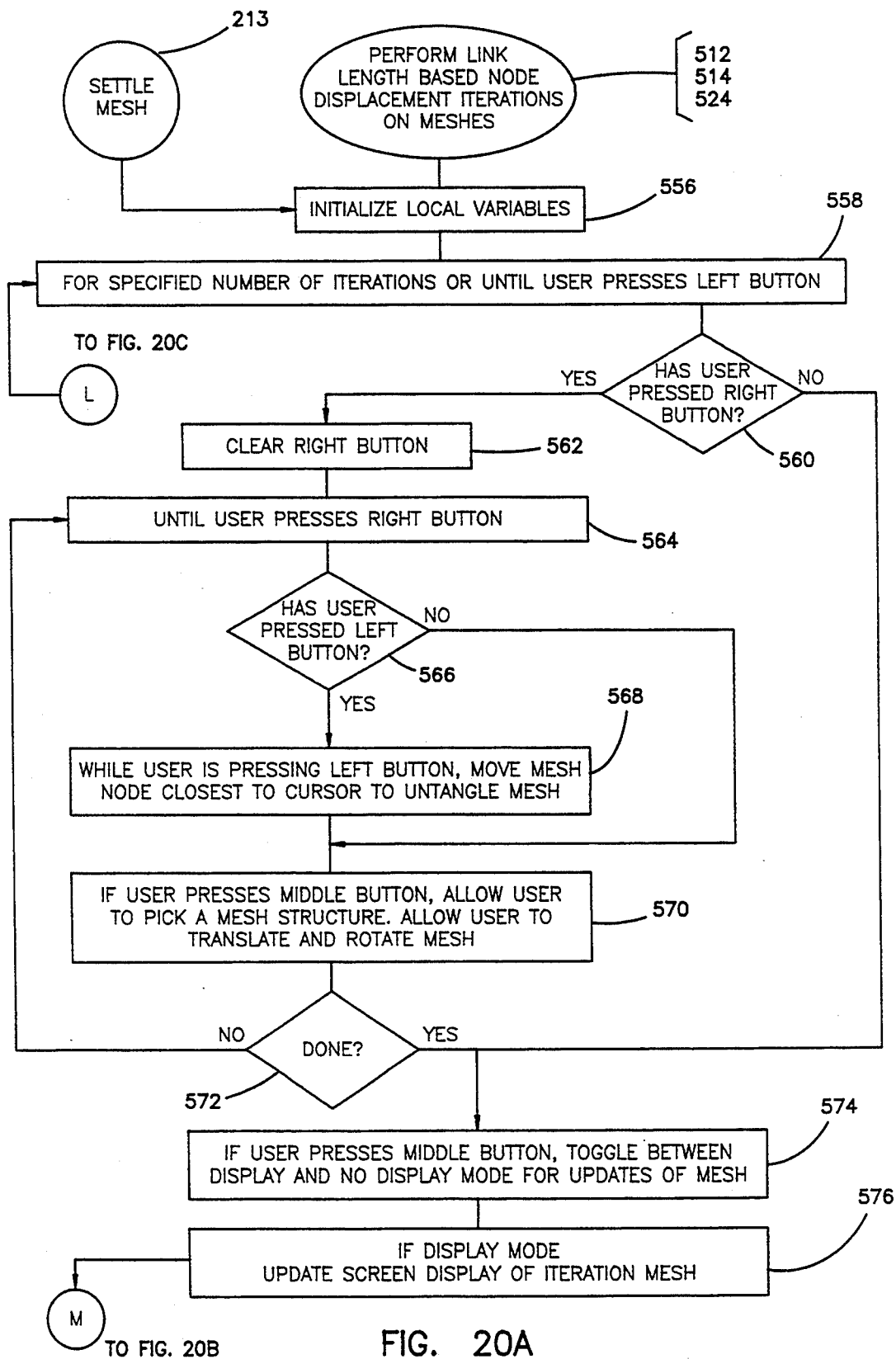
Figure 20B:
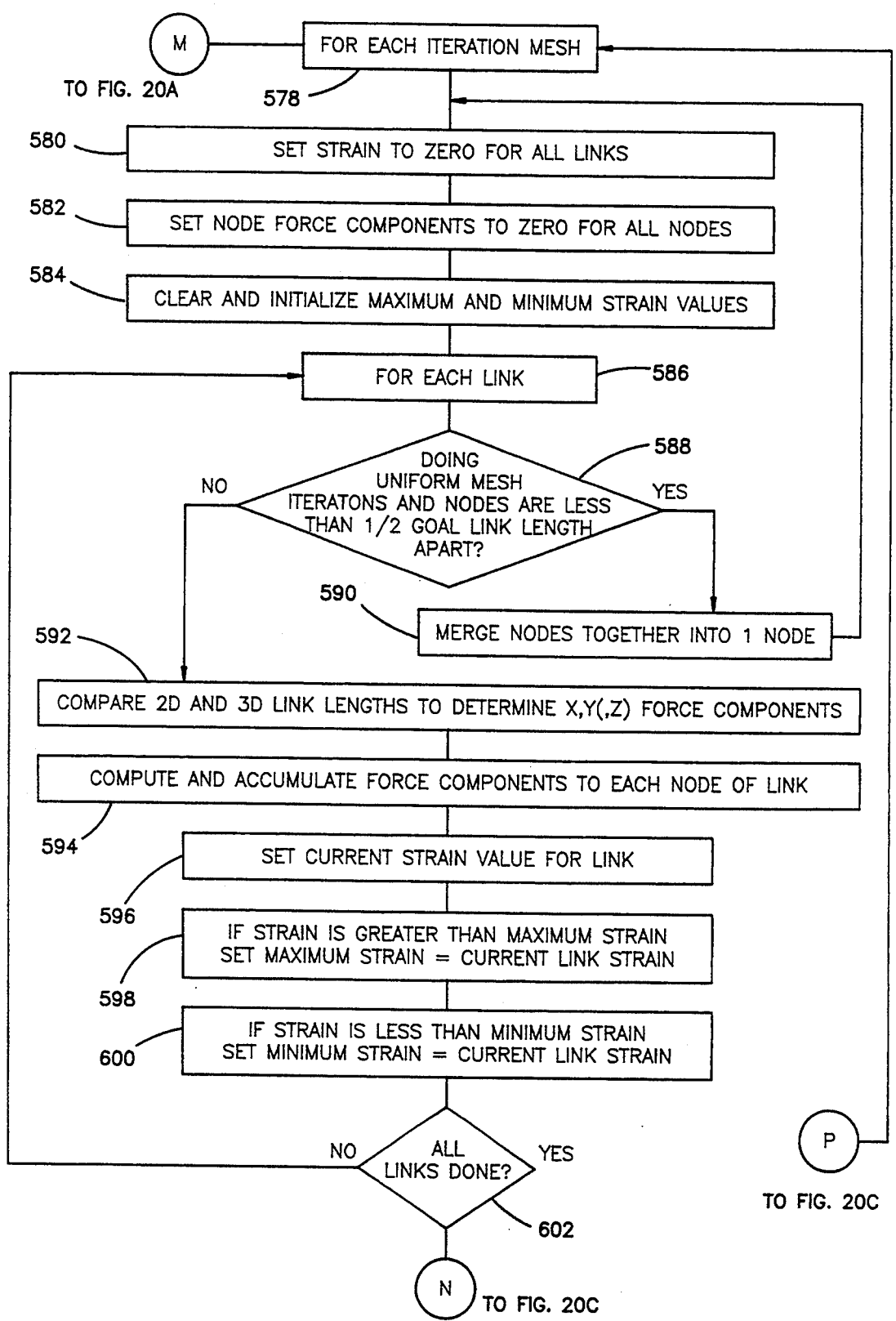
Figure 20C:
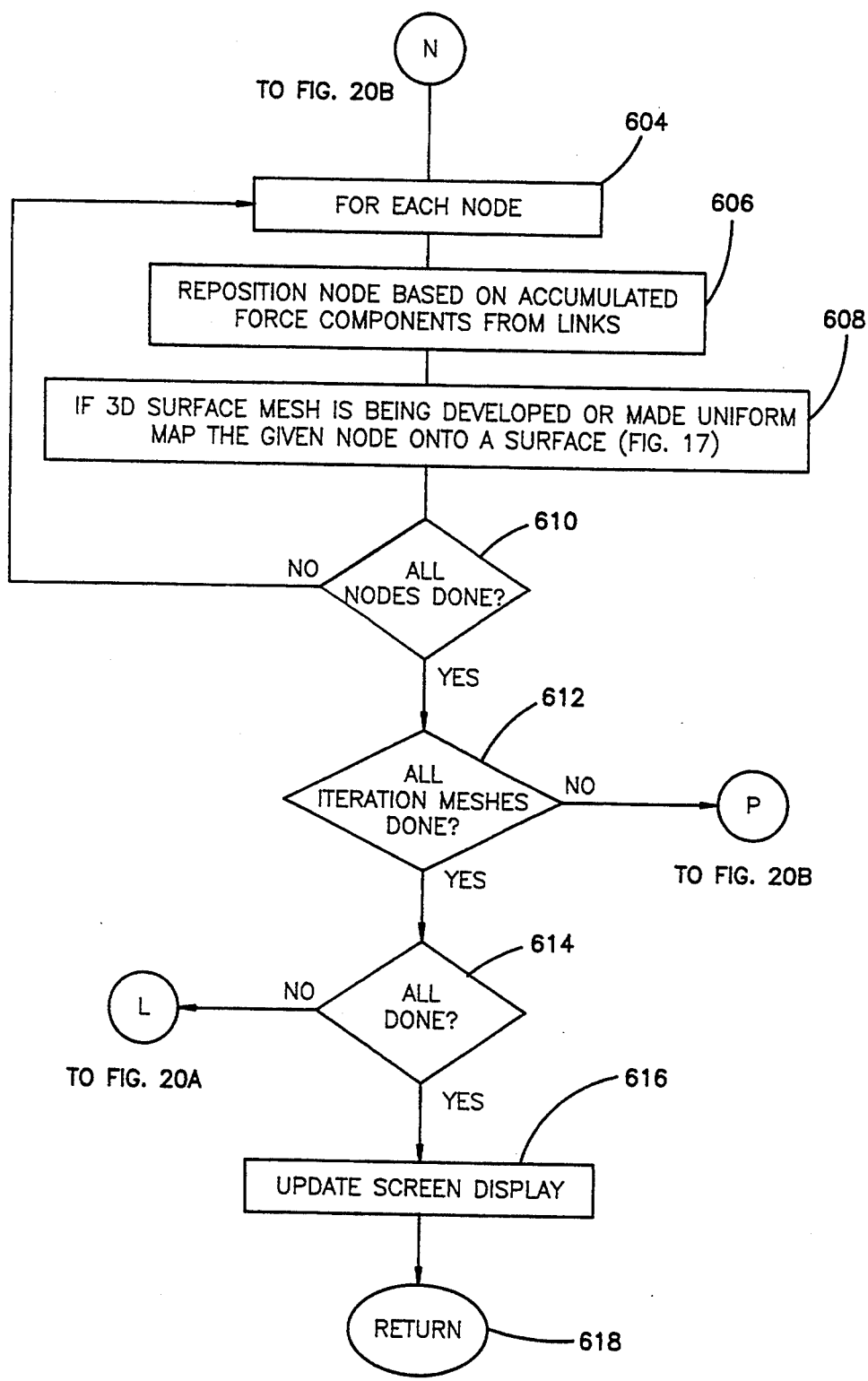
Figure 21:
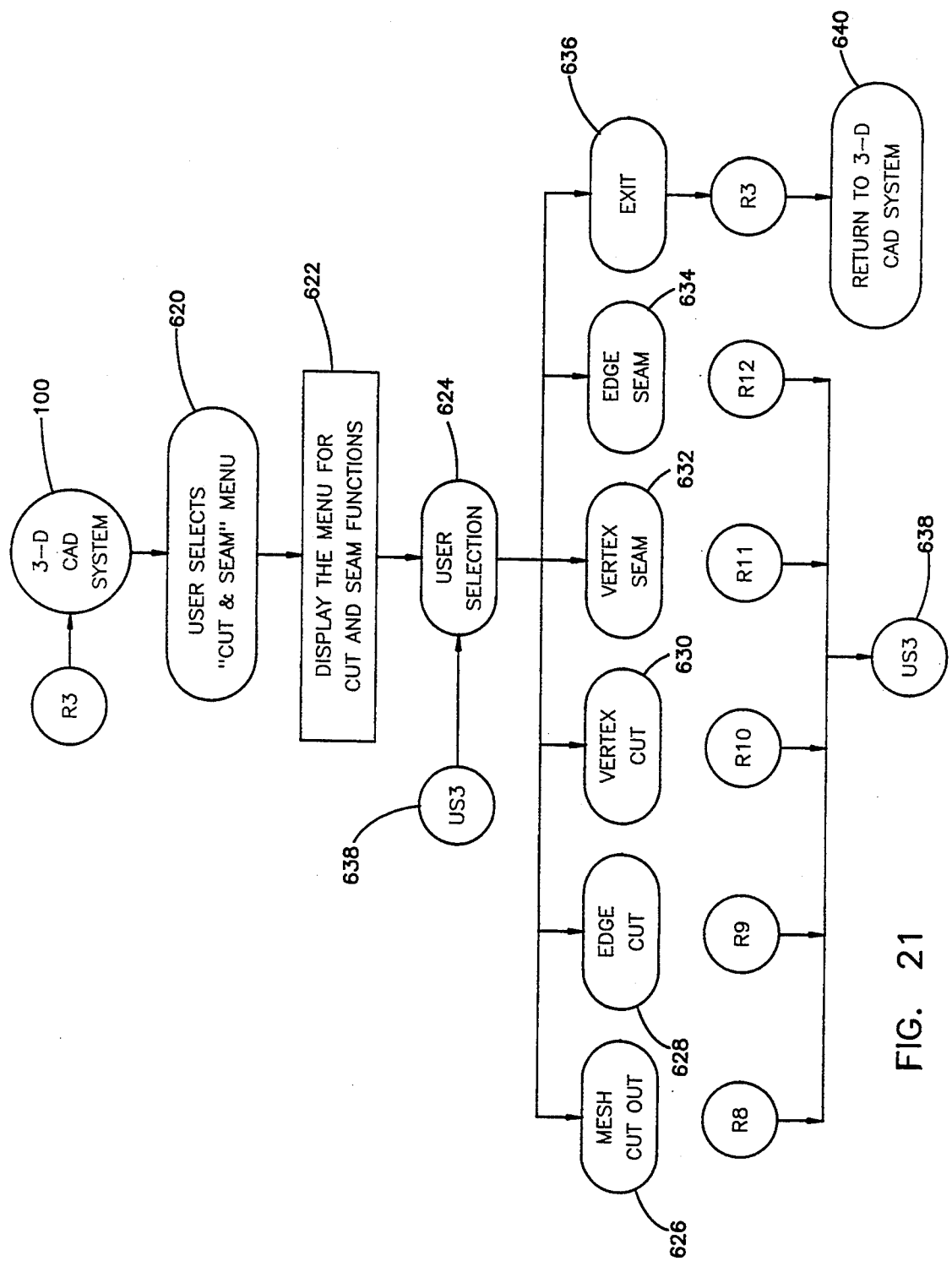
Figure 22:
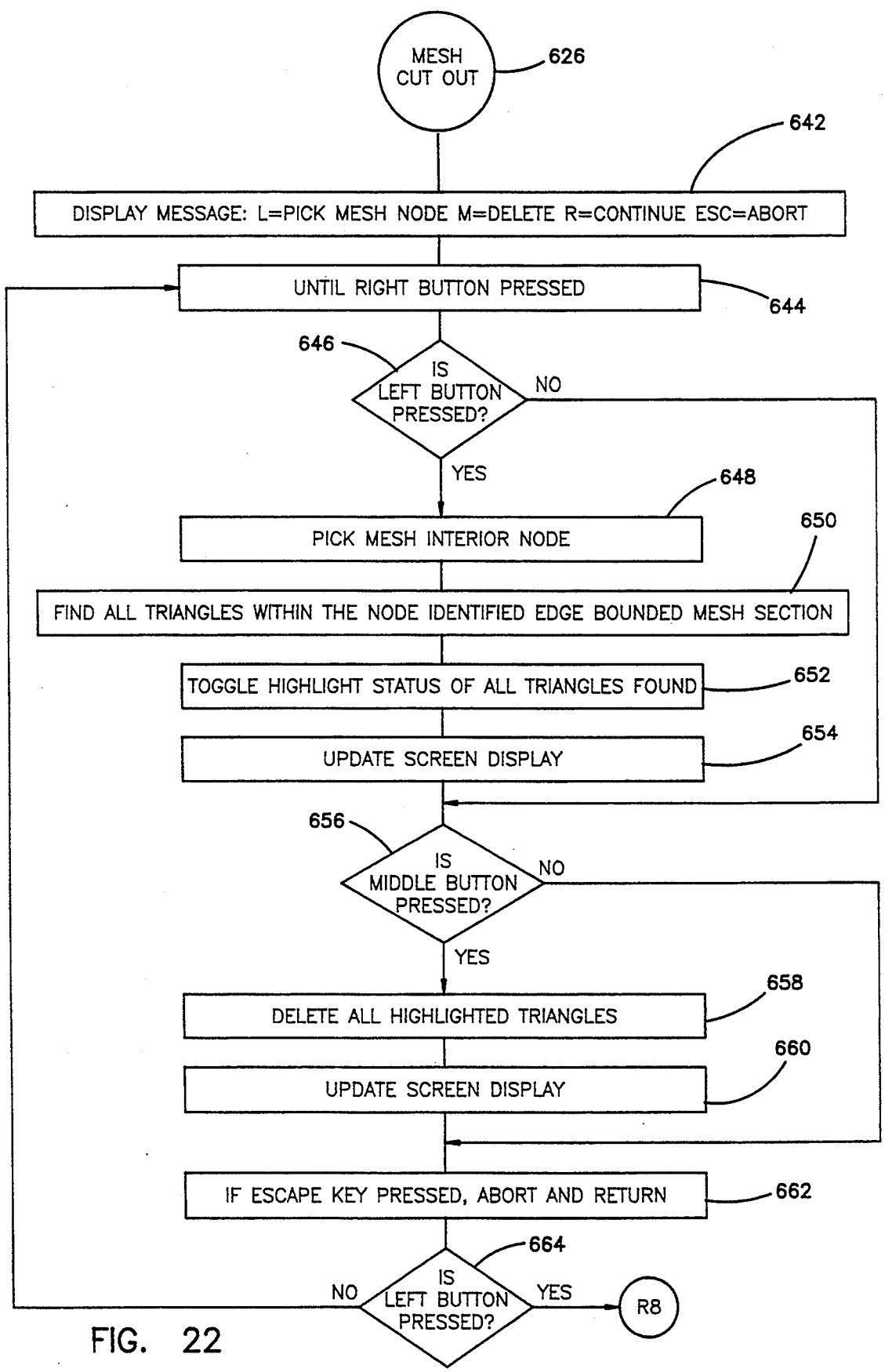
Figure 23:
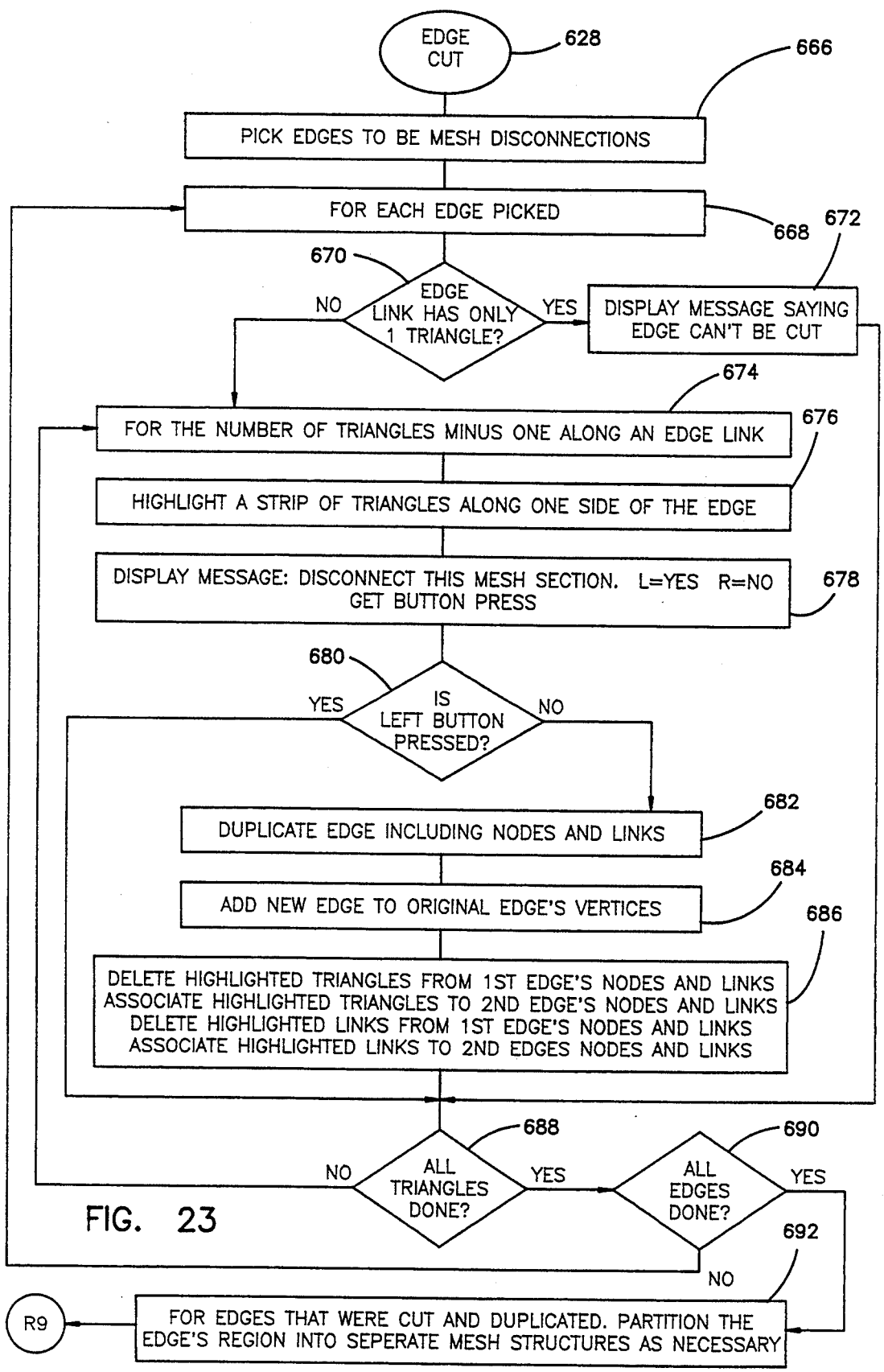
Figure 24:
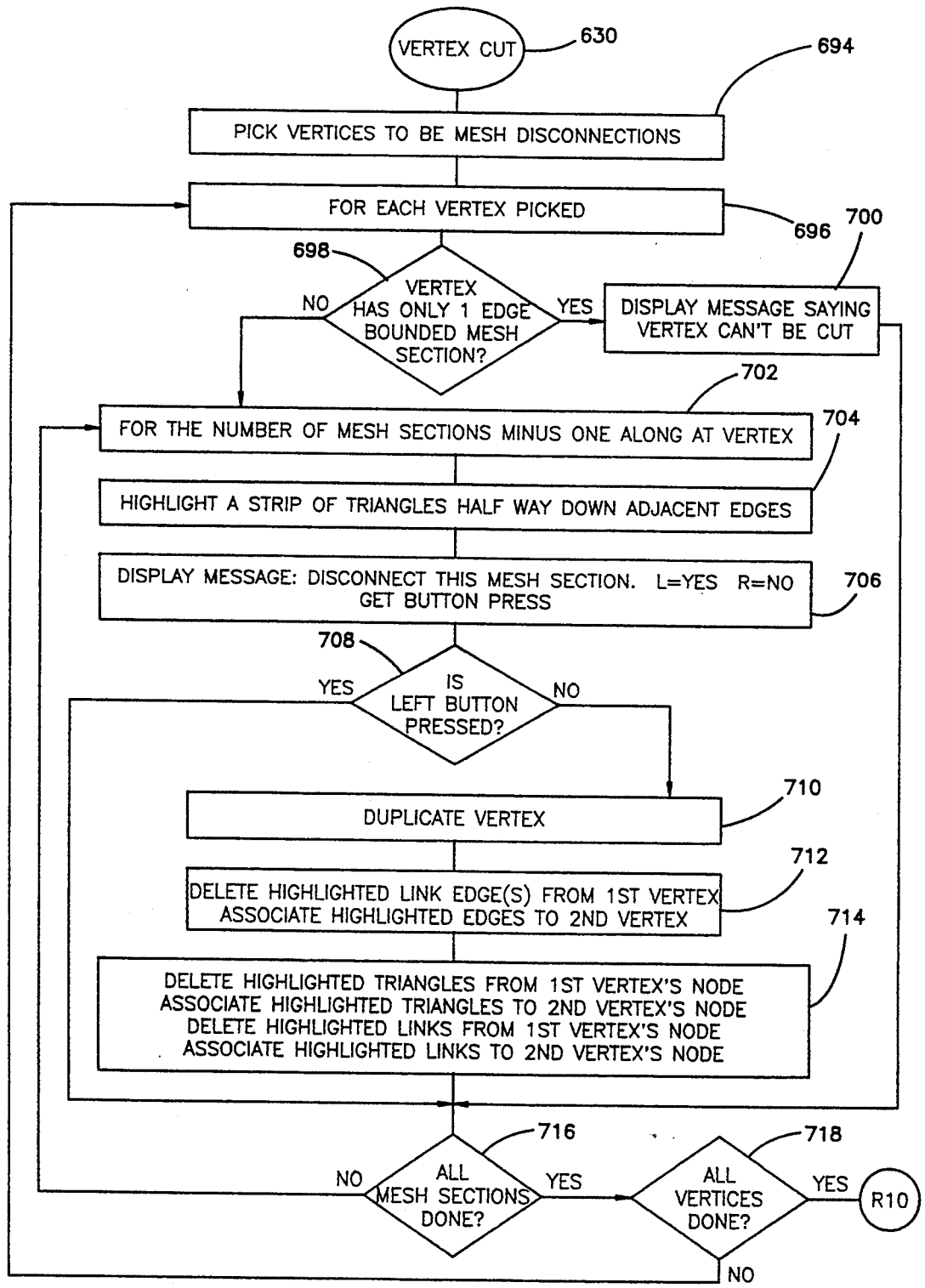
Figure 25:
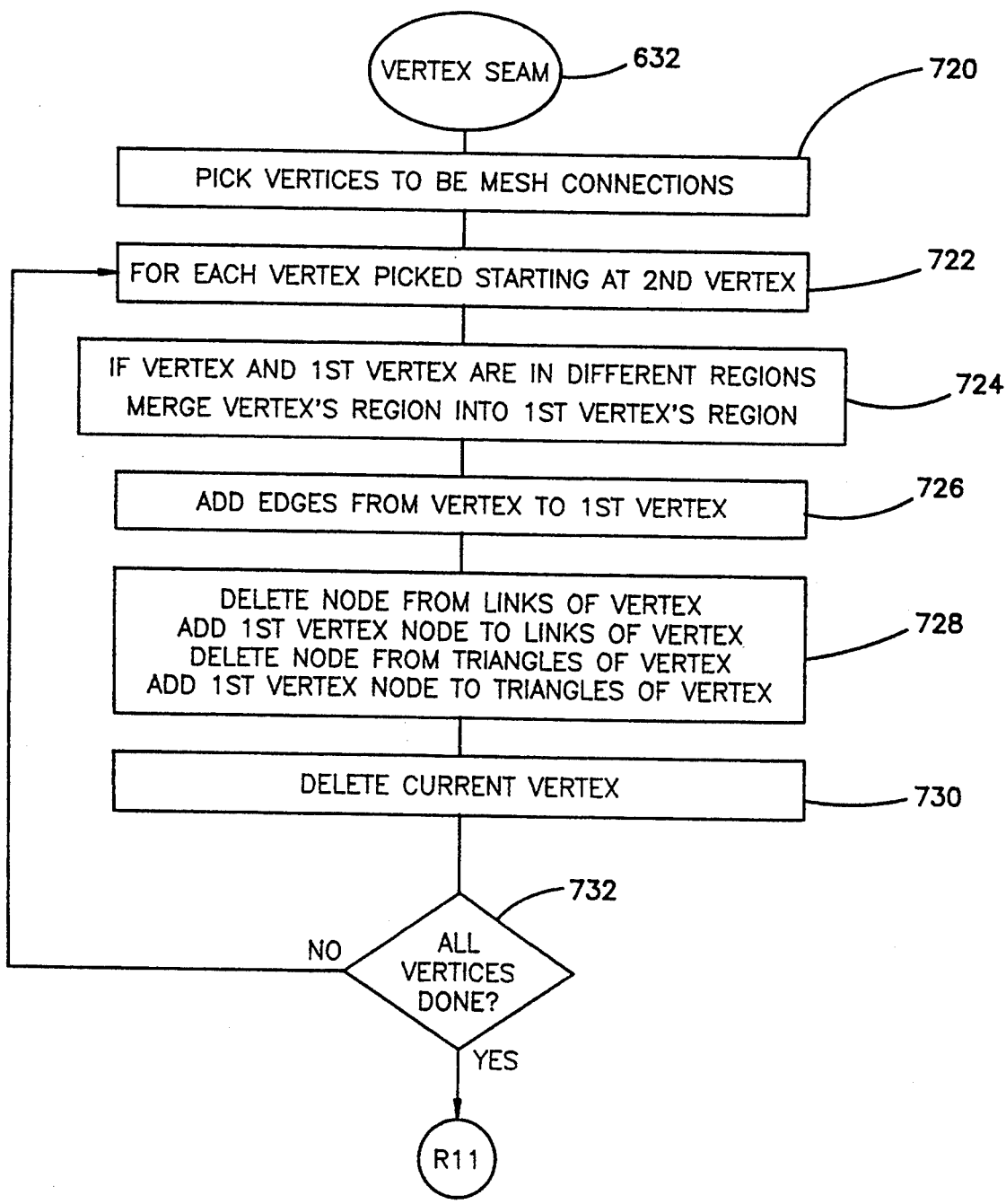

plane at the beginning of development of a two-dimensional regional mesh;

FIG. 7f illustrates an additional layer of triangular elements being assembled onto the initial cluster of triangular elements illustrated in FIG. 7e;

FIG. 7g illustrates further development of the two-dimensional regional mesh in FIG. 7f during its development in the (x,y) plane;

FIG. 7h illustrates a completed two-dimensional regional mesh developed from the three-dimensional surface illustrated in FIGS. 7a–7d;

FIG. 8 is a flow chart of the create region function;

FIG. 9 is a flow chart of the pick surfaces sub-function;

FIG. 10 is a flow chart of the pick curves sub-function;

FIG. 11 is a flow chart of the pick points sub-function;

FIG. 12 is a flow chart of the delete region sub-function;

FIG. 13 is a flowchart of the two-dimensional/three-dimensional mesh development function;

FIGS. 14a–4c are a flow chart of the mesh development sub-function;

FIGS. 15a and 15b are a flow chart of the enclose node with triangles routine;

FIG. 16 is a flow chart of the map node and new linked nodes onto a surface routine;

FIGS. 17a–17c are a flow chart of the map (x,y,z) point onto an adjacent surface routine;

FIGS. 18a–18c are a flow chart of the unwrap and flatten sub-function;

FIG. 19 is a flow chart of the add new triangle ring to iteration mesh routine;

FIGS. 20a–20c are a flow chart of the perform link length based node displacement iterations of meshes routine;

FIG. 21 is a flow chart of the cut and seam function;

FIG. 22 is a flow chart of the mesh cut-out sub-function;

FIG. 23 is a flow chart of the edge cut sub-function;

FIG. 24 is a flow chart of the vertex cut sub-function;

FIG. 25 is a flow chart of the vertex seam sub-function; and

Figure 26:
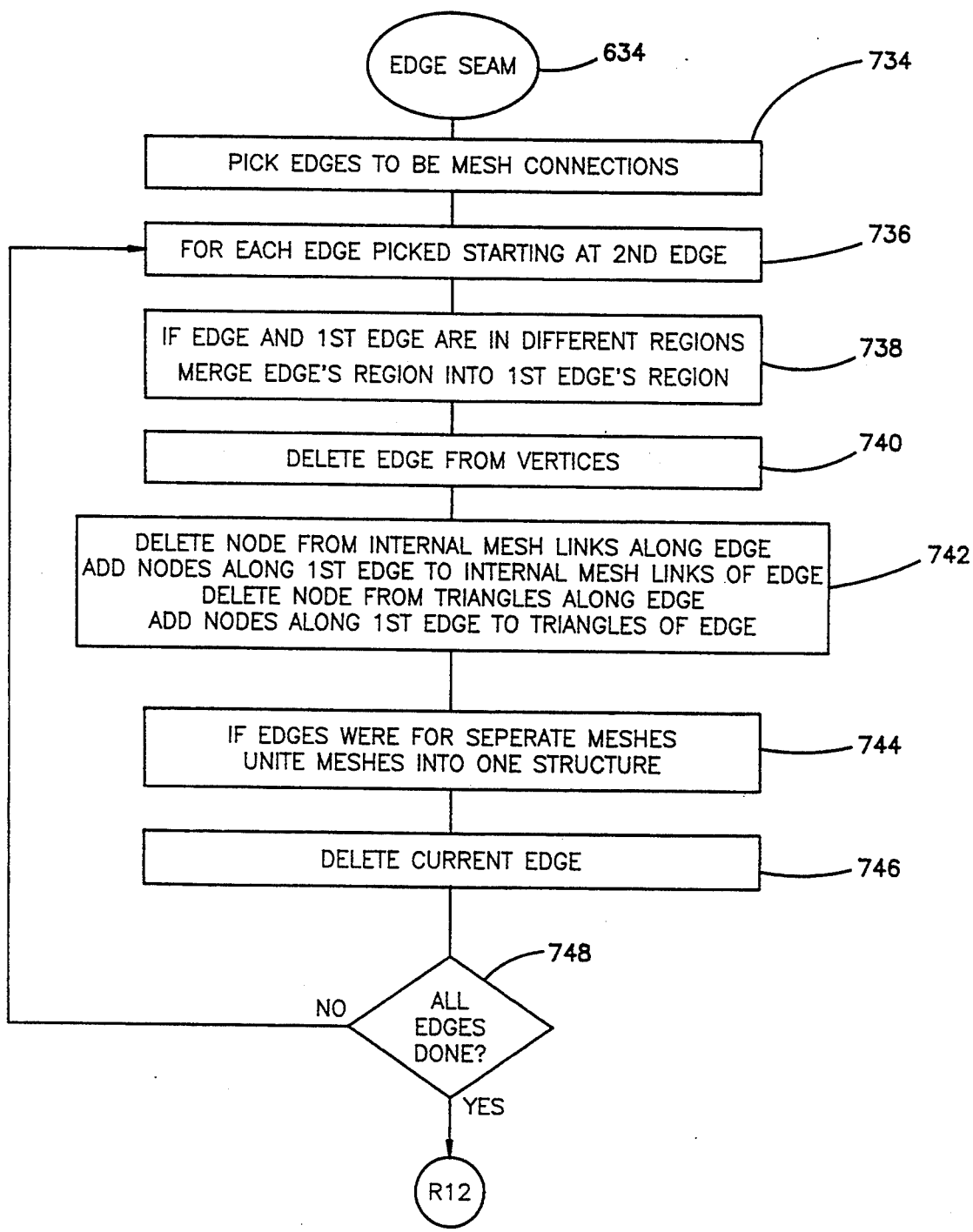

FIG. 26 is a flow chart of the edge seam sub-function.

DESCRIPTION OF THE PREFERRED EMBODIMENT

Figure 2:
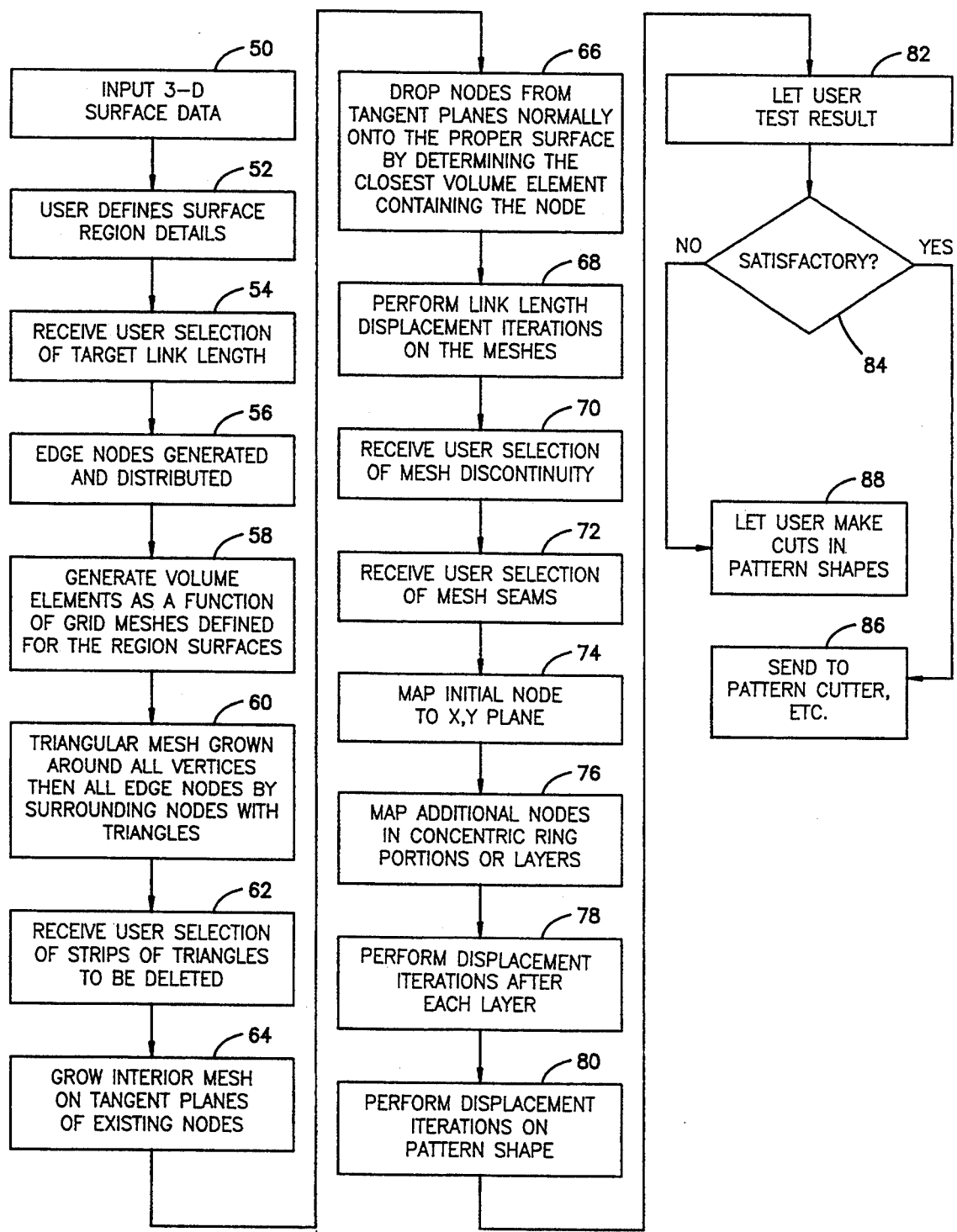
FIG. 2 is a process diagram of a method for growing a surface mesh and for flattening a three-dimensional system according to one aspect of the invention.
Figure 3A:
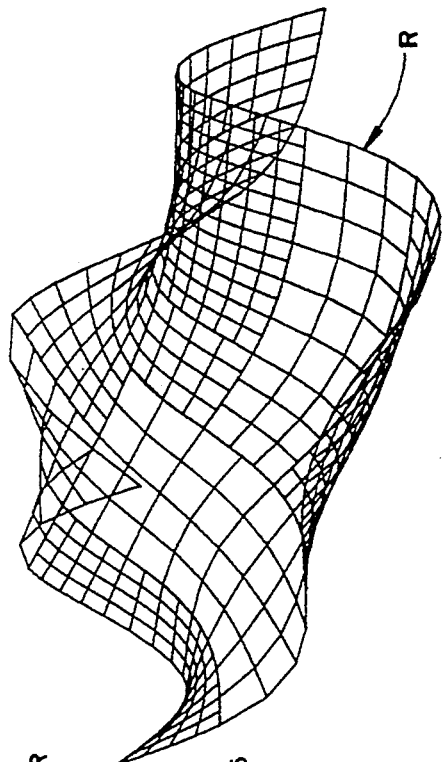
FIGS. 3a–3d are, respectively, a top view, an orthographic view, a front view and a side view of a surface region defined by several mathematical surfaces that are tiled together.
Figure 3B:
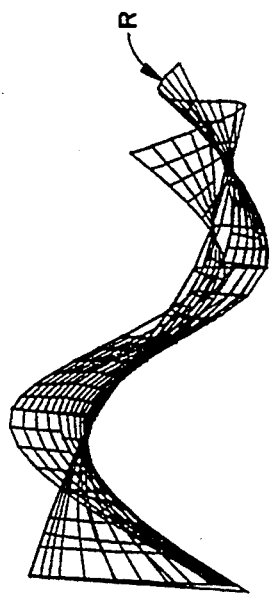
Figure 3C:
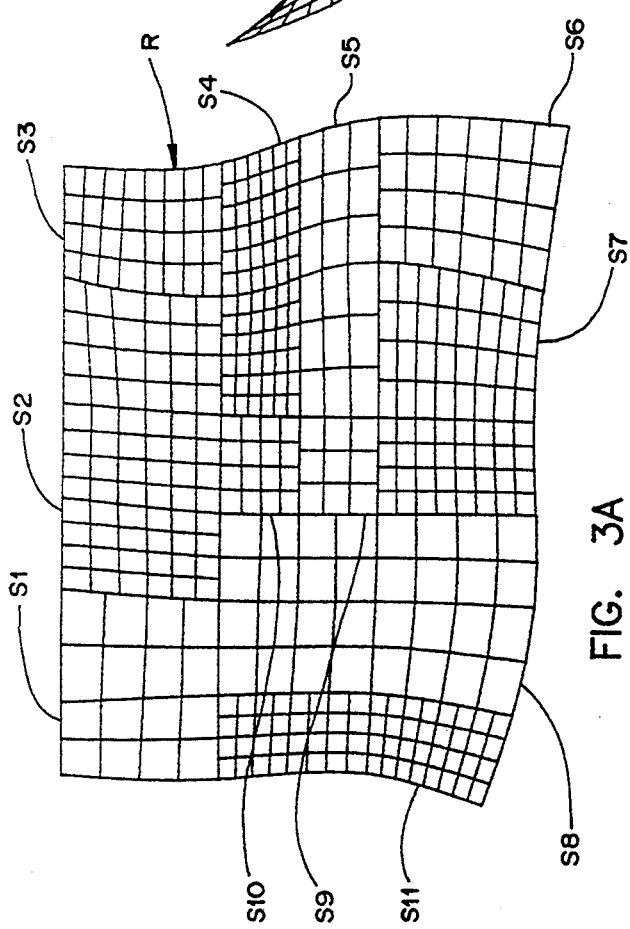
Figure 3D:
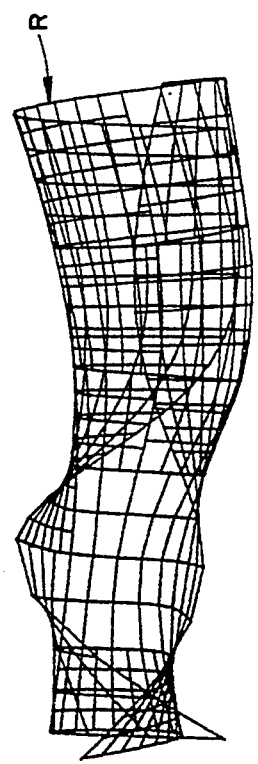

Referring now specifically to the drawings, and the illustrative embodiments depicted therein, in a three-dimensional CAD system, a group of surfaces and surface curves S1–S10 that represent a surface region R, as illustrated in FIG. 3a, of an object are inputted or defined (50) using a conventional mathematical scheme of parametric curves and surfaces, such as a B-Spline, Bezier, NURBS, and the like (FIG. 2). The surface data is displayed on a graphic output device such as a CRT, in order to allow the user to define (52) a region on the surfaces to which a triangular mesh is to be grown in order to unwrap the region mesh into a flat pattern shape. The user selects the surfaces, surface curves and, in some cases, specific surface points, that are to define the edges and vertices of a surface region. An edge, such as reference numbers E1 and E2 in FIG. 4b, is usually used to designate a discontinuity in the regional mesh. This can be for positional discontinuity, where the physical edge of the material that the region represents is indicated. Also, edges can define a tangential discontinuity (not shown), where a sharp ridge, or the like, exists in the surface region. Such tangential discontinuities require special consideration as will be set forth in more detail below. Edges are terminated at vertex points, designated V1–V3.

A triangle mesh, or simplicial triangulation, is composed of nodes innerconnected by links to form triangles, in preparation of generating a triangular mesh, the system receives (54) the user selection of a target, or "goal" link length, or assigns a target link length upon default. A link is a directed distance on the surface region and is connected between two nodes. It is also a triangle side. A goal of the mesh generation function is to grow a mesh of equilateral triangles of a size established by the goal link length.

Figure 4:
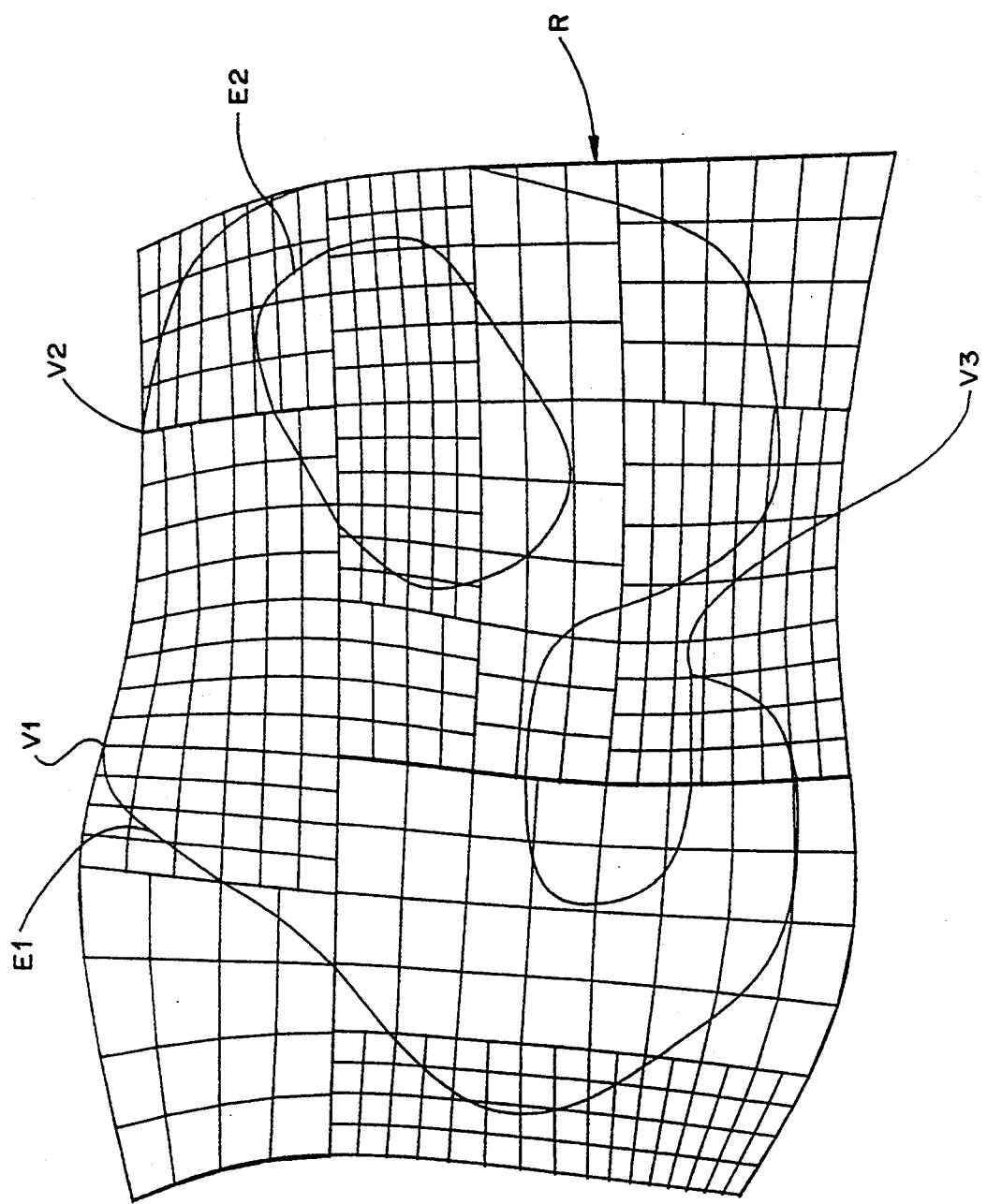
FIG. 4 is the same surface region in FIG. 3a illustrating an arbitrarily shaped region boundary spanning the separate surfaces.
Figure 5A:
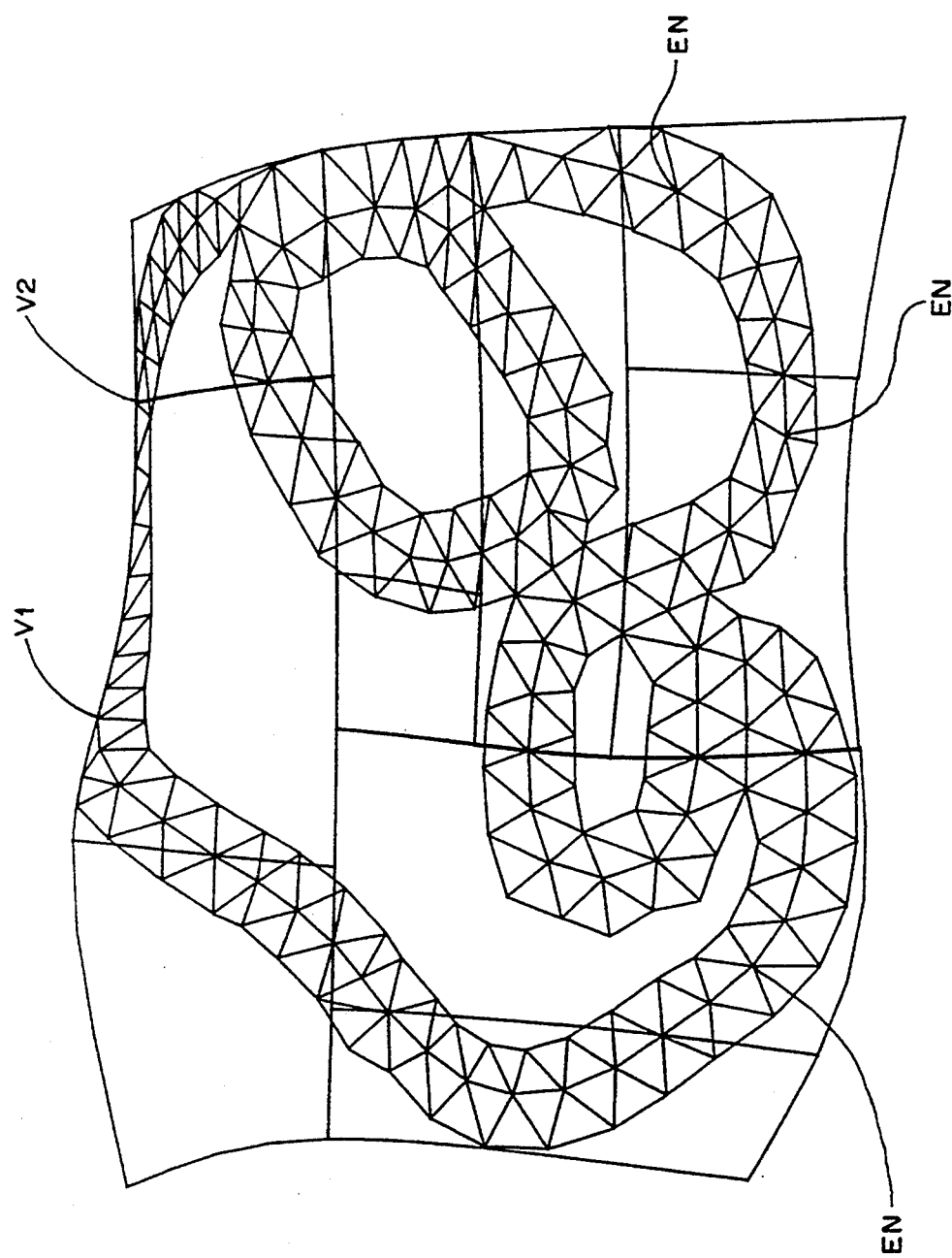
FIG. 5a is the same surface region in FIG. 4 with the surface region edge and vertex nodes enclosed with triangular elements.

Edge nodes, designated EN in FIG. 5a, are generated (56) and distributed along all the edges of the surface region, spaced apart based upon the target link length. After this is done, volume elements are generated (58) as a function of the conventional quadrilateral surface mesh that accompanies each mathematical surface in the surface region, as best seen in FIGS. 3a and 4. Each volume element is made up of sides extending in both the positive and negative directions of the mathematical surface a distance equal to the target link length of the triangular mesh. A triangular mesh is then grown (60) by generating triangles along all the vertex nodes V1–V3 followed by all the chains of edge nodes EN. This is done by enclosing, or surrounding, each node with triangles. When all the vertices and edges have been enclosed by triangles, the user can select (62) edge bounded connected sets or strips of triangles and delete same so that no further triangles are created in areas bounded by the deleted strips, as may be seen by comparing FIGS. 5a and 5b. This indicates the perimeter edge P of a region and portions where holes in the pattern shape are to be located, as illustrated in FIGS. 7c and 7d.

The triangular mesh is grown over the quadrilateral surface meshes of each mathematical surface defining the surface region on the tangent planes of existing nodes. These tangent planes provide special growing surfaces that are separate from the mathematical surfaces involved. The nodes of the triangular mesh are subsequently dropped normally onto the mathematical surface using the volume elements. The purpose of the volume elements is to efficiently and unambiguously determine to which surface a particular node is to be normally dropped. This feature is particularly useful where the surface undulates and folds in a way that is severe relative to the target link length. The volume element containing a particular node is used to determine the surface and the position on the surface to which the particular node is to be dropped. This is accomplished by the position of the node in the parameter space of the surface being approximated from its position relative to the perimeter base coordinates of the four corners of the volume element. In the case where multiple volume elements contain a particular node, the volume element that has the node closest to its center in the direction normal to the surface is selected.

Figure 5B:
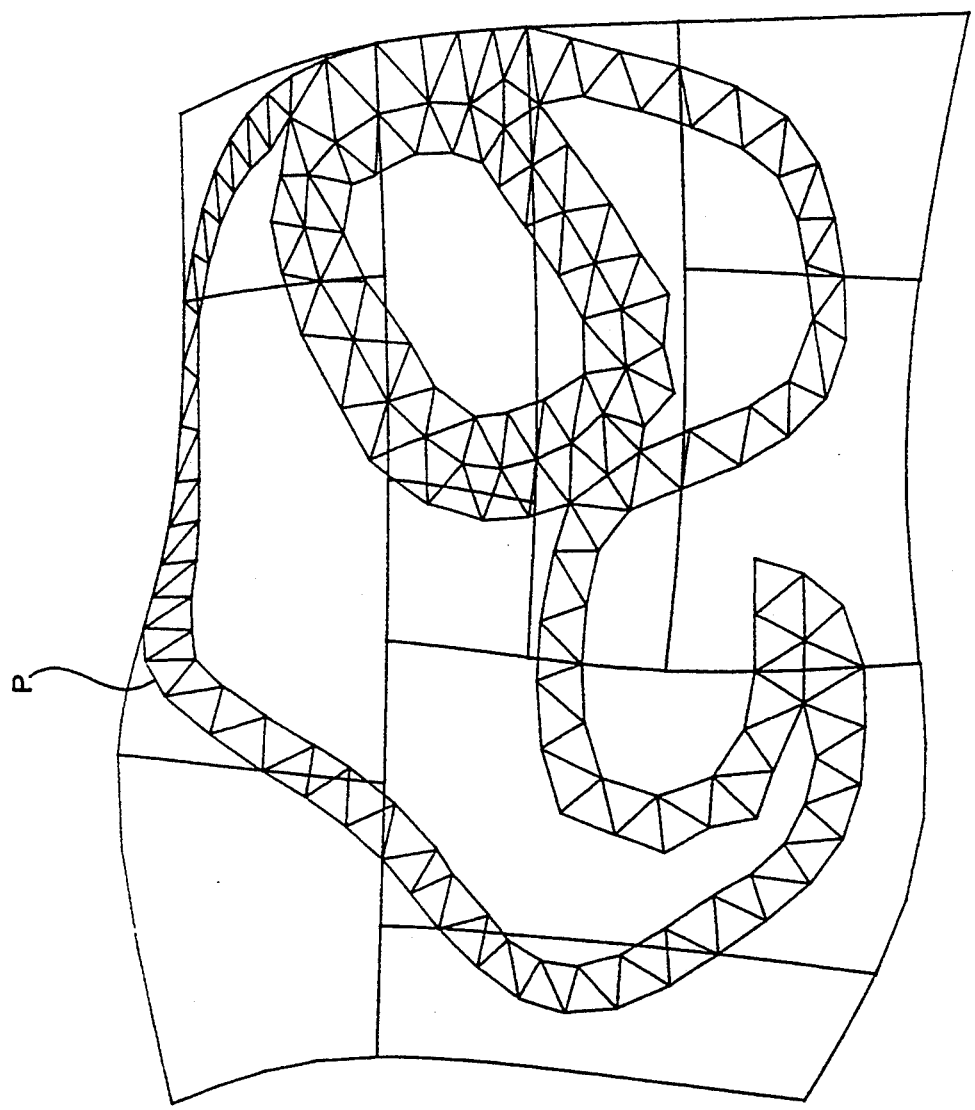
FIG. 5b is the same surface region in FIG. 5a with the surface region interior indicated by the user having picked nodes to delete ribbons of triangles around the outside of the region.
Figure 5D:
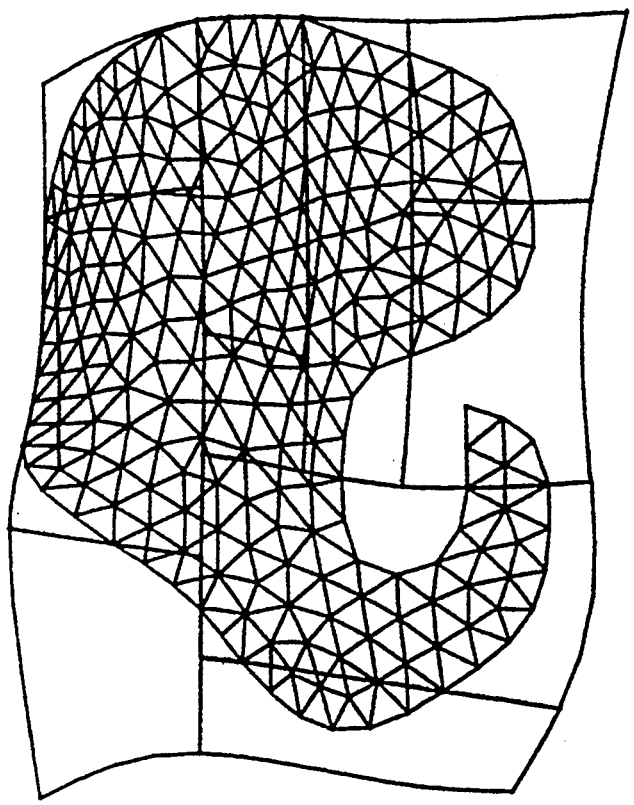
FIGS. 5c and 5d are the same surface region in FIG. 5b illustrating the growing of an interior mesh.
Figure 5C:
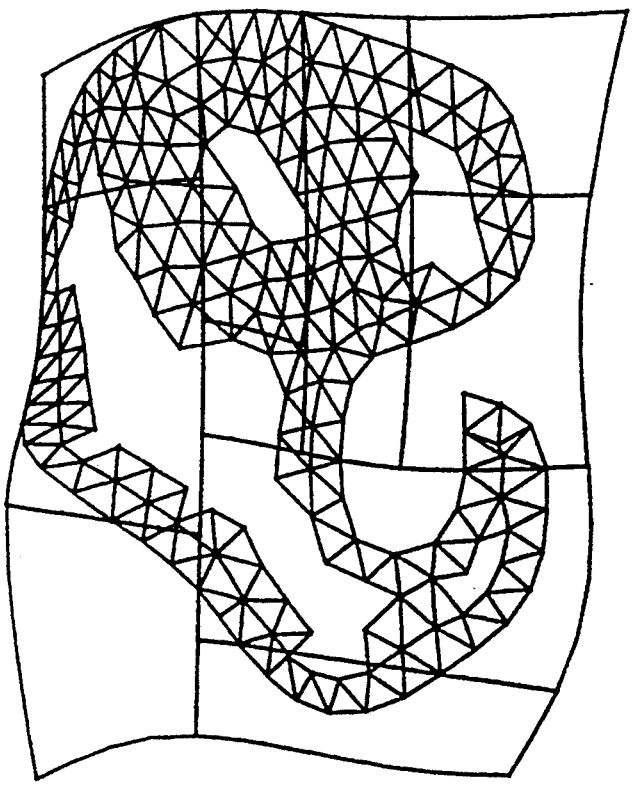

The interior mesh is grown (64) by repeatedly executing the same node triangle enclosure program used at the vertices and along the edges to continually keep surrounding nodes with triangles, as illustrated in FIGS. 5c and 5d. As nodes are enclosed, new nodes, links and triangles are created causing the mesh to "grow" over the surface region. This growth stops when the last node is enclosed, which happens when the mesh connects itself together at some place in the interior of the region, as seen in FIG. 5d. The process of enclosing a given three-dimensional surface node with triangles is a two-dimensional technique that is carried out on a local tangent plane to the surface at a given node. At each node on a three-dimensional surface, there is a normal vector which defines a tangent plane. All existing nodes that are in proximity to the given node are projected onto the nodes surface tangent plane. Because each existing node is joined with at least one link, except for very unusual circumstances, the node enclosing program examines the number of links surrounding that node. Depending upon the result, the program generates additional nodes and triangles with a goal of enclosing the node by six triangles, with some enclosed by five and some enclosed by seven. A check is performed to eliminate the occurrence of nodes being enclosed by three, four and eight or more triangles. The given node is centralized within its immediately linked nodes and it and all new nodes created are mapped and dropped normally onto the region surface (66) using the volume elements, as previously set forth above.

When a surface region triangular mesh is complete, or even when it is only at some stage during its growth, a set of iterations can be applied to the mesh (68) to make the size and shape of the triangular elements more uniform. This is done by comparing the length of each non-edge link in the mesh to the target link length specified by the user. The ratio of the two lengths for each link is used to determine a displacement for each of the link's two nodes. The displacements are accumulated to each non-edge node from all of its links and the nodes are repositioned back onto the new surfaces in new positions. This iterative process of repositioning all of the interior nodes in the mesh is continued a given number of times or until the net displacement for each node falls within a given tolerance. Edge nodes are excluded and remain fixed.

Figure 6F:
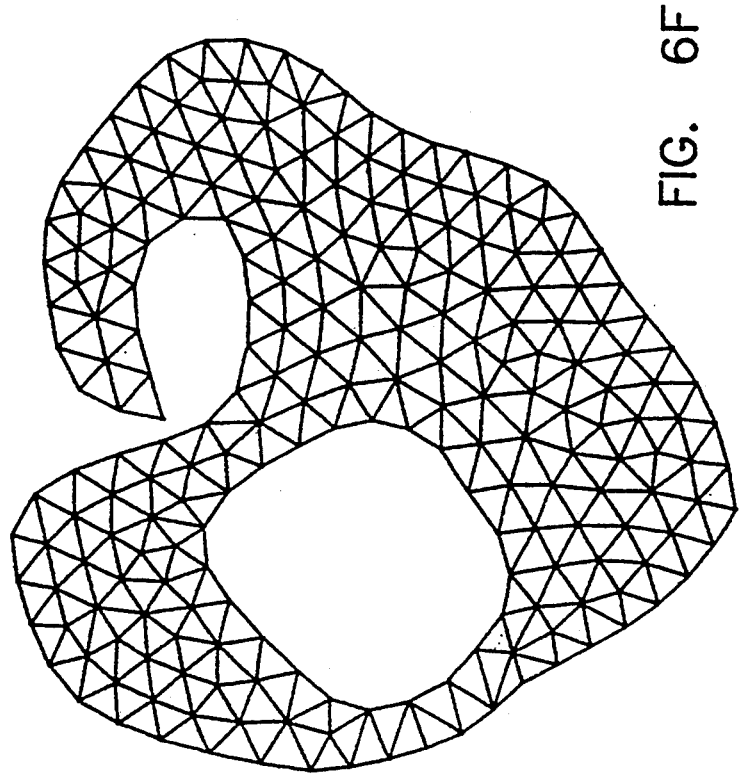
FIG. 6f is the same view as FIG. 6d of a two-dimensional (x,y) plane mesh with a hole or cut-out being made.

Once a three-dimensional surface region mesh is generated, a corresponding flat pattern shape can be developed (FIGS. 6a-6d). Before unwrapping the surface region mesh, the user selects (70) any edges and vertices that are to be mesh discontinuations or cuts. This is accomplished by selecting and confirming mesh sections along each edge to be disconnected and at each vertex to be disconnected, as illustrated in FIGS. 7a and 7b. The user may additionally select (72) edges of the mesh that are to be seamed mesh sections such that the meshes are united into one single mesh structure in the system. If the separate meshes belong to separate regions, the regions are also united into one single region.

Once all disconnections, voids and seams are made by the user, the system automatically takes the last node N created when the mesh was generated, and maps (74) that node to the flat plane, as illustrated in FIG. 6a. Alternatively, the user may select any node in the mesh as a starting point. All triangles T that surround the initial node are projected onto the tangent plane of the surface region at the node. The given node and all those immediately linked to it now have a position in the flat (x,y) plane. The length of the links L in the two-dimensional mesh are compared to their corresponding lengths in the three-dimensional surface mesh. The difference in these two link lengths is used to determine a displacement in the (x,y) plane equally for each link's two nodes. If the two-dimensional link length is shorter than the three-dimensional length, the two nodes of the link would have a displacement accumulated to them that would move them further apart and visa versa. The x and y components of this difference along the direction of the link in the (x,y) plane are split in half and accumulated positively to one node of the link and negatively to the other node of the link. After a few sets of displacement iterations are made (76), another set of iterations are made on all the nodes currently in the (x,y) plane. After this, a new layer, ring or ring portion of triangles is added (78) to the outside of the existing (x,y) plane mesh, as illustrated in FIG. 6b, and the displacement iteration is repeated (80) until the entire pattern is developed, as illustrated in FIG. 6d.

For surface regions having Gaussian curvature, such as a bump or saddle, the lengths of the links in the (x,y) plane cannot be made to equal the lengths of the corresponding links on the parametric surface region. However, an optimum solution is iteratively developed for the shape of the two-dimensional pattern. Any remaining "tension" and "compression" corresponding to the discrepancy between the lengths of the links in the three-dimensional and two-dimensional spaces, is displayed by coloring the links a color corresponding to the amount of compression or tension on that link. A color band is displayed on the display device to provide a key to the tension and compression colors. The displaying of tension and compression data provides the user with a tool for testing the results of the flattening procedure (82). If the user is satisfied (84), the pattern shape may be sent (86) to a pattern cutter or the like. If the results are not satisfactory, the system provides the capabilities (88) for the user to make cuts in the pattern shape, as set forth in detail in the Wu '444 patent.

A. DESCRIPTION OF THE HARDWARE

Figure 1:
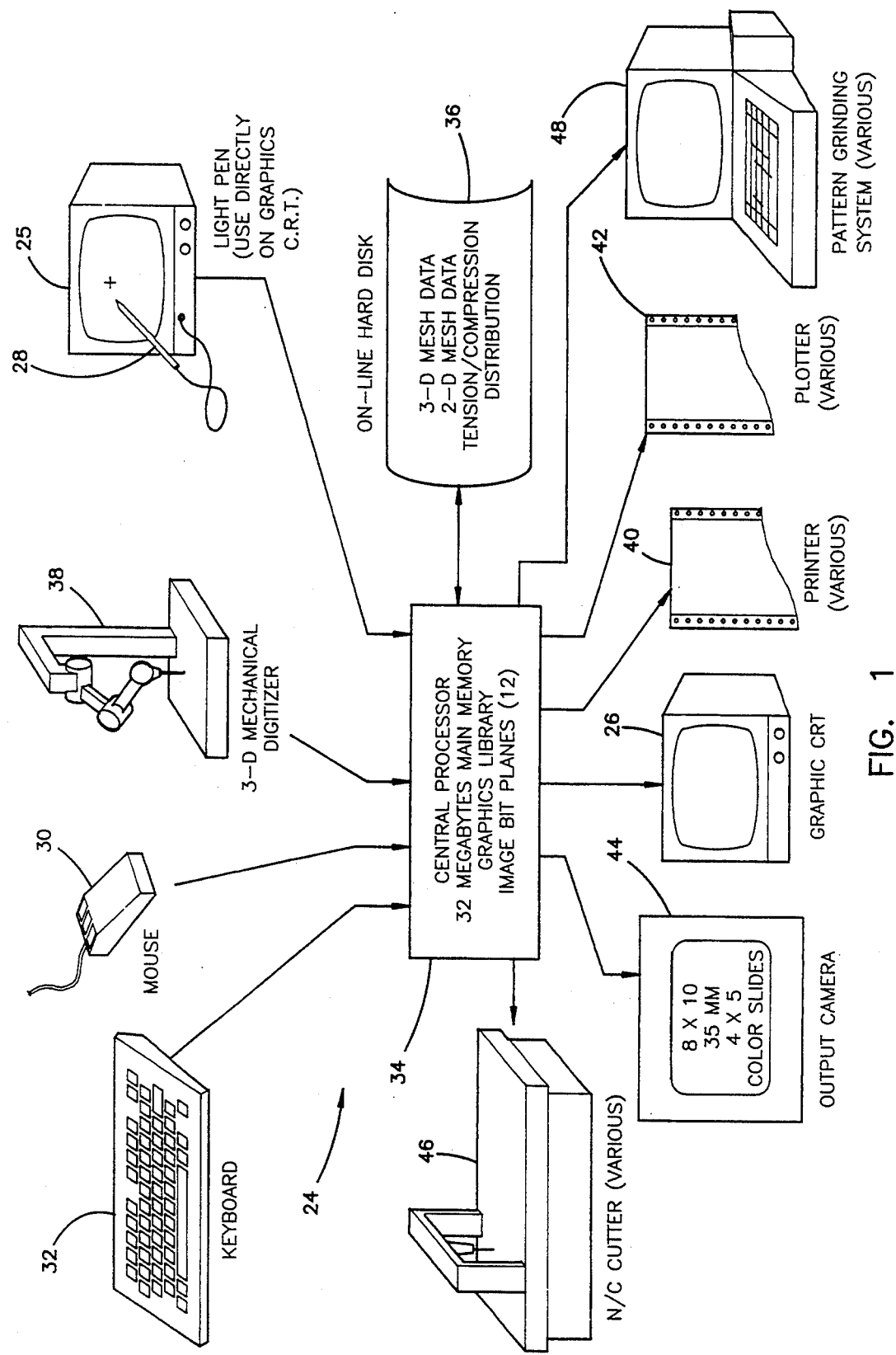
FIG. 1 is a block diagram of a computer-assisted design system useful with the present invention.

The hardware requirements to support the present invention are basically those needed to support a standard three-dimensional CAD system. As illustrated in FIG. 1, CAD system 24 includes a graphic visual input/output device, such as CRT 25 and 26, with a standard light pen 28 and mouse 30 used as locating instruments, a keyboard 32, a central processing unit 34 and a data storage unit 36, which is preferably a hard disk storage unit. Light pen 28, mouse 30 and keyboard 32 are input devices for CPU 34. Input may additionally be provided from a three-dimensional laser or mechanical digitizer 38. The output of system 24 may be directed to a graphic CRT 26, which is a high resolution 1024 by 1280 pixels, a printer 40, plotter 42, output camera 44, numerically controlled cutter 46 and a pattern grading system 48.

The central processing unit 34 should support floating-point mathematical computation required for the preferred embodiment of the invention. At least two display duffers are required to dynamically present the growing flat pattern being developed by the system and at least one other image, such as the three-dimensional image or previously completed pattern pieces. Central processing unit 34 should have a minimum of 32 megabytes of resident memory with 200 megabyte storage capability in hard disk 36 to provide adequate storage of the data files supporting the three-dimensional software system, including the mesh nodal points link and triangle data of the three-dimensional image, the mesh data of the two-dimensional patterns and the tension and compression stress distribution for multiple patterns. Additional memory may be received if very fine meshes or complex object surfaces are processed.

An example of a suitable system 34 is a Silicon Graphics, Inc. IRIS workstation utilizing the Unix operating system developed by American Telephone and Telegraph, Inc. and a Silicon Graphics, Inc. standard graphics software system.

B. DESCRIPTION OF THE SOFTWARE

In providing a system for developing a mesh on a surface region conforming to the topology of the surface and for flattening a three-dimensional surface into a two-dimensional pattern shape, the software is divided into six groups of functions as (1) Definition of a surface region graph;

(2) Generation of a surface region triangular mesh;

(3) Selection of cuts and holes in a surface region mesh;

(4) Flattening and iteration of a surface region mesh;

(5) Display of link length discrepancy in a surface/pattern region mesh; and (6) Permanent storage of a surface/pattern region into a disk file and retrieval; of a surface/pattern region in a disk file.

The particulars of function (5) above are set forth in detail in the Wu '444 patent and will not be repeated herein. The particulars of function (6) is well known to those of ordinary skill in the art and will not be repeated herein.

In invoking the present invention, the user will be provided with a menu having the following choices:

| | |
|---|---|
| "Create region": | Creating and deleting regions and curves and points of regions; |
| "2-D/3-D mesh development": | Developing a mesh on selected or all regions of a two-dimensional or a three-dimensional object; |
| "Cut and seam": | Selection of holes, cuts and seams in a surface region mesh; |
| "Link color": | Display of multi-colored mesh and a color band to link length discrepancy; |
| "Disk file": | Store and retrieve surface and region data. |

FIG. 8 illustrates the main flow chart for the creating and deleting regions function and outlines a function that allows the user to select various sub-functions for creating surface regions and defining curves and points on the surface regions, as well as for deleting regions, from a menu displayed on the system. Once the surface of a three-dimensional object is defined using some mathematical scheme where many different surfaces may be tiled together to define the form of the object's surface, and once surface curves exist on the surfaces that define the boundary of some region of interest, such that curves also exist along any critical ridges of surface tangent discontinuity in the surface region, the user selects the "create region" function on the menu of the three-dimensional CAD system. The function, as a whole, is invoked from the exits to standard three-dimensional computer-assisted design system software 100. Once invoked from the three-dimensional CAD system 100, the function illustrated in FIG. 8 allows the user to select (102, 104, 106) from a menu of any of the individual sub-functions 108, 110, 112 and 114 associated with creating and deleting regions, plus an "exit" 116 function. Each of the sub-functions 108–114 execute some portion of the creating and deleting regions process. Once each of these sub-functions 108–114 finishes its task, control is returned to the creating and deleting regions function illustrated in FIG. 8, indicated by the labels R1 and R2. Control is then passed back to the menu selection (U.S. 1) 118 so that the user may proceed to the next sub-function. When the "exit" function is selected, this function terminates and control passes back to the three-dimensional CAD system 100.

The pick surfaces sub-function 108 allows the user to select surfaces. The pick curves sub-function 110 allows the user to select curves and the pick points sub-function 112 allows the user to select points on the surfaces using a locating device such as mouse 30. When this is complete, a display of the edges and vertices of the region created appears on the three-dimensional surface of the model object, as illustrated in FIG. 4. If the user selects only surfaces, separate regions are created for each surface and edges and vertices are displayed on the surface boundaries where each surface completely defines one region. Surface curves that are picked by the user with sub-function 110 are selected from curves that defined by and are apart of the particular surface region definition. If mathematical surface definitions exist that are imbedded in a tiling of surfaces where only the edge surfaces in the tiling have surface curves to bound the surface region on the object, it will be necessary to invoke the pick surfaces sub-function to separately select and identify the areas on the objects surface where such surfaces exist. If the pick points sub-function 112 is invoked by the user to select points on a surface, the function also selects the particular surface as part of the region definition. The user invokes the delete region sub-function 114 to pick region(s) and delete them from the internal data structure in the computer memory.

The user can pick specific points to be vertices, existing surface curves to be edges, and mathematical surfaces as necessary to properly define a desired surface region. When the pick surfaces sub-function 108 is selected, the system prompts the user (122) to select surfaces. If it is determined at 124 that only surfaces are picked, the system generates a separate region for each entire surface selected. The system does this by automatically creating (126, 128, 130) four edges and four vertices along the boundaries of each four sided surface. If it is determined at 124 that both surface curves and/or surface points were selected, the system creates (138, 140, 142) one region and creates vertices and edges for the points and/or curves selected.

If the pick curves sub-function 110 is selected, the system prompts user to select curves at 144. The selected curves may likely already define a network via curve common points at knots along the curve splines. The system goes through several simple steps that progressively build toward the creation of the final region graph. A single edge is created (146, 148) for each curve common point on each edge, if the curve common point is within the edge, the edge is split at the curve common point (150). When all curves are processed (152), for each curve common point a single curve common point merges multiple vertices together into one vertex (156, 158, 160, 162, 164, 168, 170).

If the user selects the pick points sub-function 112, the system prompts user to select vertices (174) using a locating device. For each vertex that now exists (176), if a vertex has exactly two edges that lie along the same curve, the vertex is deleted and the two edges are joined into one edge (178, 180). A vertex is created for each independent point that the user may have picked (182). An initial set of nodes are created and distributed (190) along each edge spaced apart uniformly in the parameter space of the curve. The region edges and vertices are displayed (192) prior to the calling program returning to the creating and deleting region function illustrated in FIG. 8 indicated at label R1.

When the user selects the delete region sub-function 114, the system prompts the user to select the region to be deleted using a locating device by identifying either a vertex, edge or mesh (194, 196). The region is cleared from the internal memory of the computer and from the display screen (198, 200).

FIG. 13 illustrates the main flow chart for the "2-D/3-D mesh development" function and outlines the function that allows the user to develop a uniform triangular mesh on a two-dimensional or three-dimensional surface. The "2-D/3-D mesh development" function is invoked from the exits to three-dimensional computer-assisted design system software 100. Once invoked from the system 100, the function illustrated in FIG. 13 allows the user to select (202, 204, 206) from a menu any of the individual sub-functions 208, 210, 211, 212, 213 and 214 associated with developing two-dimensional and three-dimensional meshes plus an "exit" 216 function. Once each sub-function 208–214 finishes its task, control is returned to the 2-D/3-D mesh development function illustrated in FIG. 13 indicated by the labels R4–R7. Control is then passed to the menu selection (U.S. 2) 218 so that the user may proceed to the next function.

When the user selects the pick regions sub-function 208 or the mesh all sub-function 210, the system prompts the user to enter a "goal" link length (224) by typing in a value on the system keyboard 32. If no value is entered, a default value is selected. If the pick regions sub-function 208 is selected, the system prompts the user to select (222) regions to be covered with mesh.

The system goes through the following sequence of internal processes to prepare for developing the mesh:

1. Deleting any existing meshes that may exist (228, 230);
2. Uniformly distributing new nodes along all edges, spacing them apart based on the goal link length (232);
3. Generating all edge links if they are not already there (234);
4. Automatically seaming any cuts that may have existed in a mesh previously generated (236);
5. Allocating memory for mesh structure and memory for internal mesh nodes, links and triangles (238); and
6. Generating surface quadrilateral mesh volume elements for mapping or dropping nodes created on surface tangent planes onto the surfaces (240, 242).

When this processing is finished, the system generates edge triangles, as illustrated in FIG. 5a. It first generates triangles around each vertex and then around each edge node. When all vertex and edge nodes are enclosed with triangles, the user is prompted to select a non-edge node with a locating device. A non-edge node identifies a ribbon of connected triangles along one side of a graph of connected edges that are to be deleted as illustrated in FIG. 5b. The region bounded by the deleted ribbon will not receive an interior mesh. The selected triangles are highlighted and the user can then verify that the highlighted triangles are to be deleted. When the user verifies that the triangles displayed represent the area where the interior mesh is to be generated, a mesh is grown over the surface(s) of the region, as illustrated in FIGS. 5c and 5d.

Each vertex in the region is enclosed, or surrounded, with triangles (244, 246, 248, 252). For each node along each edge in the region, the node is enclosed with triangles (254, 256, 258, 260, 262, 264, 266, 268). If a triangular mesh is being generated in the (x,y) plane, the connected ribbon(s) of triangles along the edges identified by the nodes with the maximum and minimum (x,y) values are deleted (270) because it is assumed that the desired region is the bounded area inside the edges, not the unbounded area outside the edges. However, if a triangular mesh is being generated on a three-dimensional surface, this automatic "inside/outside" determination cannot be made because the surface can fold and bend in ways that make it too difficult or impossible to identify nodes with maximum and minimum (x,y,z) values. The user is prompted to select, with a locating instrument, a node to identify ribbons of triangles to be deleted in order to indicate the inside and outside of the surface region (272, 274, 276).

The index of the first non-edge node in the mesh's array of nodes is set and the node enclosure program is called to enclose the node with triangles (278, 280, 282). As nodes are enclosed with triangles, new nodes are constantly being created thus increasing the size of the mesh's node array. Eventually, nodes begin to be enclosed with triangular elements without the need of creating new nodes. As this occurs, the current index in the node array can catch up to the end of the node array and the mesh generation stops with the mesh completed (298, 300). At any time during this interior mesh development, the user can press a mouse button to update the screen display of the growing mesh (296) or the user can press a different mouse button to pause the mesh growth and then select a node that identifies an edge bounded mesh section to be deleted where the user may have inadvertently missed and not selected and deleted all of the nodes that should have been to indicate where no mesh was to be (288, 292, 294). When the region mesh is complete, the system partitions the region into separate mesh structures as necessary so each disconnected mesh section has its own mesh structure (304, 306, 308, 310, 312).

The process of enclosing or surrounding a node with triangles (246, 258, 282) is accomplished by first determining whether the node is flagged as "enclosed" (314, 318, 320). If it is determined at 320 that the node is not enclosed, all nodes in proximity to the node are determined (322, 324). These nodes include all nodes one and two links away from the node being enclosed and all nodes within a sphere of radius approximately $1\frac{1}{2}$ times the goal link length centered at the node being enclosed. The nodes that are in this sphere are actually determined via another cube and sub-cube structure which contains memory pointers of all nodes in a given cube where the size of the sub-cubes are approximately $1\frac{1}{2}$ times the goal link length. All nodes in the surrounding sub-cubes of the node being enclosed are checked to determine whether they exceed the maximum allowed link length from the node to be enclosed. The surface (x,y,z) positions of the proximity nodes are saved (324) and replaced by a position which is their projections onto the surface tangent plane at the node being enclosed, with the plane being rotated so that it is parallel with the (x,y) plane (326). The Z coordinate is dropped for all the proximity nodes on the tangent plane, and links are created in this (x,y) plane connecting all nodes possible to the node being enclosed such that no intersecting links are formed (328). The links to the node being enclosed are sorted in circularly adjacent order with the angles between adjacent links being calculated (330). If it is determined (332) that the node being enclosed is not an edge or vertex node, new links to it are deleted if the adjacent angle is less than a determined angle which varies as a function of the linear relationship between the length of the link and the angle, considering the optimum angle to be 60° and the optimum link length to be the goal length (334, 336). If links were deleted, the proximity nodes positioned on the surface are restored and the current node index in the mesh array is reset (338, 340). If it is determined at 332 that the node being enclosed is an edge or vertex, a cluster of nodes is formed to enclosed the node with triangles (342, 344).

There are a few basic rules used to determine how many triangles are to be formed and where new nodes are to be placed when enclosing a node. For a single node with no links, which can only occur initially for an isolated vertex node, six nodes are created, 12 links are created, and 6 triangles are created to enclose the node where all the angles of the triangles formed are 60 degrees. For the usual case of when a node already has triangles and/or links to it, the angles between new links have to be determined. The rules for angular spacing between links are as follows: (1) if the angle is less than or equal to 90 degrees, the two links are used to form one triangle; (2) if the angle is greater than 90 degrees and less than or equal to 150 degrees, the angle between the two links is bisected with another link and two triangles are formed; (3) if the angle is greater than 150 degrees and less than or equal to 210 degrees, the angle between the two links is trisected with two links and three triangles are formed; (4) if the angle is greater than 210 degrees and less than or equal to 270 degrees, the angle between the two links is split equally into fourths with three links and four triangles are formed; (5) if the angle is greater than 270 degrees and less than or equal to 330 degrees, the angle between the two links is split equally into fifths with four links and five triangles are formed; and, (6) if the angle is greater than 330 degrees, the angle between the two links is split equally into sixths with five links and six triangles are formed.

If, for some reason, an error occurs and the sorting program detects that the node is not completely enclosed with triangles, an error message is displayed (346, 348). Otherwise, the node is flagged and is centrally positioned within its linked nodes (354) provided that the node is not an edge or vertex node. If the node is not an edge or vertex node and has not been flagged as "dead", it is determined (356) if the node is enclosed by three, four, or more than seven triangles (358). If the node is enclosed by three or four triangles it is deleted. Otherwise, the node is split in two creating another adjacent linked node thus reducing the number of triangles around the node. If during the process of checking for an erroneous number of enclosed triangles, a node was not deleted (360) and if a mesh is being generated for a three-dimensional surface, then any new nodes created to enclose the node with triangles, along with the node just enclosed, are mapped or dropped normally onto a mathematical surface of the surface region (366).

When a node and any new linked nodes are mapped or dropped normally onto a surface (366), the nodes are first rotated such that the plane thereon is again tangent to the surface at the central node (370, 372, 374). Such mapping techniques are well known to those of ordinary skill in the art. If it is determined (376) that the mapping of a new node was not successful and the central node is an edge or vertex, it is assumed that the central node could be on the physical edge of the object (380). When this occurs, no error is considered to have occurred and the new node is simply deleted (382). If the mapping of the central node (which is occurring because it was repositioned centrally on the tangent relative to its linked nodes) is determined to not be successful (376), the central node is "flagged or marked" so that no further attempts are made to enclose it with triangles and an error message is displayed (384). When the mapping is successful, the nodes take on a new (x,y,z) position on the surface and a normal direction (378).

When a node and any new linked nodes are mapped or dropped normally onto a surface, the precise position of that node on the surface results in an (x,y,z) position, an x,y,z, normal direction a surface quadrilateral element ID number and a surface ID number (392-474).

Unwrapping and flattening of a three-dimensional surface region is done when a mesh has been grown on the surface region. When the user selects the unwrap and flattening by picking sub-function 211, the user is prompted to indicate with a locating device the desired region(s) to be flattened. When the user selects the unwrap and flatten all sub-function 212, all regions are flattened. Next, the user is prompted to enter the number desired node displacement iterations to be performed on the two-dimensional mesh at each stage during its growth. Alternatively, the user is prompted to indicate whether the addition of new layers or rings of triangles to the two-dimensional mesh is to be under user prompt or performed automatically when a given number of iterations has been performed.

The system initially places a first cluster of triangles flat in the (x,y) plane, as illustrated in FIG. 6a. Then successive rings, layers or ring portions of triangles are assembled onto the expanding perimeter of the two-dimensional mesh as illustrated in FIGS. 6b–6d. Node displacement or settling iterations are consistently shifting the node positions in the (x,y) plane to minimize any tension or compression that may be building in the region mesh in order to minimize any inaccuracies that may be occurring due to non-zero Gaussian curvature in the surface region. If selected by the user, the two-dimensional mesh is displayed in multiple colors, links that are under tension and compression based upon the color band displayed on the screen.

The unwrapping and flattening, or iteration of the region mesh, is a sub-function that is used for unwrapping and flattening a three-dimensional surface region mesh in to a two-dimensional (x,y) plane mesh. A settling mesh sub-function 213 portion of the iteration of the region mesh program is provided for iterating a three-dimensional surface region mesh or a two-dimensional (x,y) plane region mesh to make the mesh elements more uniform in size and shape. If the unwrap and flatten by picking sub-function 211 is selected, the system prompts the user to pick the regions to be flattened (477). If the unwrap and flatten all sub-function 212 is selected, all regions are flattened. After the region(s) to be flattened are initialized for iterations (480), the user is prompted to indicate whether the iteration counts are to be controlled manually via mouse button presses or whether specific counts are to be entered at the keyboard indicating a fixed number of iterations to be performed at each stage of the development of the two-dimensional mesh (482, 484, 486, 488).

For each region selected, further initialization is performed (490-502). A first node and local cluster of triangles is loaded by projecting the surface nodes in the local cluster on to the surface tangent plane at the first node (504, 506, 508). The tangent plane is then rotated parallel to the (x,y) plane and the z coordinate is eliminated. This first node is automatically taken by the system to be the last node created during the generation and growth of the region mesh over the three-dimensional surface region. Alternatively, the first node can be selected by the user. The initial triangle cluster placed in the (x,y) plane is iterated (512) to reposition the node such that the discrepancies between the two-dimensional link lengths and the three-dimensional link lengths are eliminated, or in the case where the surface contains non-zero Gaussian curvature, are minimized.

To add a new layer or ring of triangles to the iteration mesh (510), the (x,y,z) positions and surface normal directions of nodes around the perimeter of the existing mesh in the (x,y) plane are used to separately project link nodes not yet in the (x,y) plane onto the individual tangent planes of each node (534, 536, 538, 540). The new nodes, which are also in the (x,y) plane, are then positioned relative to each other and relative to existing nodes in the (x,y) plane to a best initial position around the perimeter of the developing two-dimensional regional mesh (542, 544, 546, 548). Next, a set of settling iterations is performed on the current new layer nodes to settle and reposition them in the (x,y) plane (550). Then, a set of settling iterations is performed on the current total iteration mesh to settle and reposition all the nodes in the (x,y) plane to minimize the two-dimensional to three-dimensional link length discrepancy (514). This process of adding a new layer of triangles, iterating the new nodes, and then iterating all the nodes continuous layer after layer until the entire three-dimensional mesh is developed in to a two-dimensional representation. If the Gaussian curvature, in the surface region, is to severe and there has not been enough cuts made in the mesh to allow for a two-dimensional development, the two-dimensional mesh will crumple-up and the flattening process will not proceed in a sensible manner. It may happen that the mesh could become tangled because not enough settling iterations were performed. In this case, the user can control the cursor on the monitor using a mouse to select nodes in the mesh and move them to untangle the mesh. It is not necessary to reposition the nodes in their correct position. When the mesh is untangled, the user can continue the settling iterations whereby the mesh will quickly reposition the nodes in to a shape providing an overall minimum set of link length discrepancies.

The settling mesh sub-function 213 may be selected by the user in order to reposition nodes during the development of three-dimensional mesh in a manner that provides more uniform triangular elements of equal size. The transform region sub-function 214 is selected by the user in order to translate, rotate or scale (215) the image displayed on the display device.

FIG. 21 illustrates the main flow chart for the cut and seam function and outlines a function that allows the user to select surface edges and vertices to be cut apart or seamed together or areas of a surface region mesh to be cut out, from a menu displayed on the system. The function, as a whole, is invoked from the exits to standard three-dimensional computer-assisted design system software 100. Once invoked from the three-dimensional CAD system 100, the function illustrated in FIG. 21 allows the user to select (620, 622, 624) from a menu any of the individual sub-functions 626-634, plus an "exit" 636 function. Each of the sub-functions 626-634 executes some portion of the cut and seam process. Once each of the sub-functions 626-634 finishes its task, control is returned to the cut and seam function illustrated in FIG. 21, indicated by the labels R8-R12. Control is then passed back to the menu selection (U.S. 3) 638 so that the user may proceed to the next sub-function.

When the "exit" function is selected, this function terminates and control passes back to the three-dimensional CAD system 100.

Figure 6E:
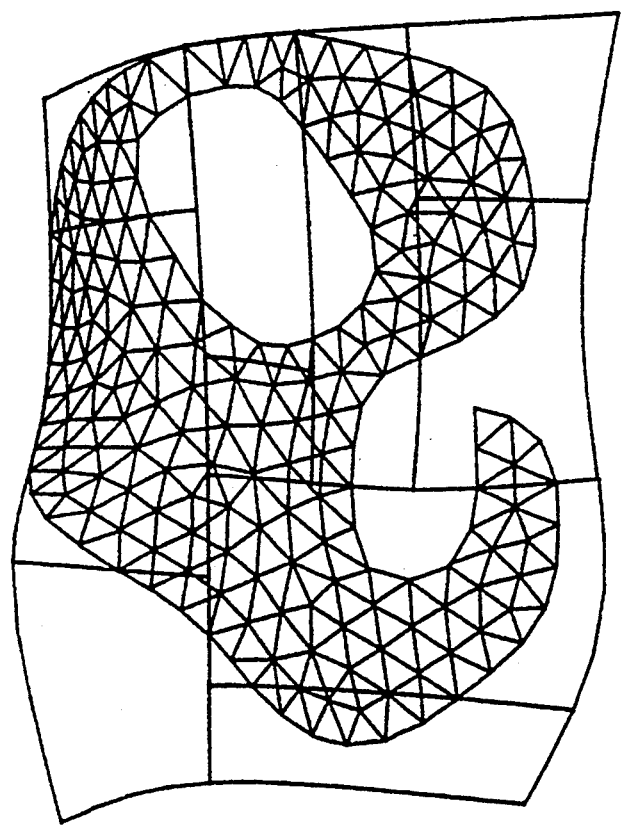
FIG. 6e is the same view as FIG. 5d illustrating a hole or cut-out in the three-dimensional surface region mesh.

When the user selects the mesh cut out sub-function 626, the user is prompted to select a non-edge node to identify an edge bounded section of the mesh (642, 644, 646). The selected triangles are highlighted and deleted if the selection is confirmed (650, 652, 654, 656). This creates a hole or void in the mesh (658, 660), as illustrated in FIGS. 6e and 6f. Holes can be selected before or after a surface region is unwrapped and flattened. Indeed, it may be preferable in many cases to first unwrap and flatten a surface region and then create holes in the mesh in order to allow the deleted triangles to serve as a "scaffold" during the growth of the two-dimensional pattern in the flattening process.

When the user selects the edge cut sub-function 628, the user is prompted to select with a locating instrument (666) the edge(s) to be disconnected in the mesh, as illustrated in FIGS. 7a-7h. Strips of triangles are highlighted one strip at a time along the selected edges to allow the user to verify that the mesh sections are to be disconnected (670-692). This allows the user to selectively disconnect only certain mesh sections along an edge where the seam sub-function 634 had previously joined more than two mesh edges. When a mesh is disconnected along an edge, it is not automatically disconnected at the edges vertices. The mesh remains pinned together at the vertices until the user explicitly indicates that it is to be disconnected there. When the user selects the vertex cut sub-function 630, user is prompted to select with a locating instrument (694) vertices to be cut. Stripes of triangles are highlighted at each selected vertex one strip at a time half away along each pair of edges that meet at the vertex (696-706). This indicates the section of the mesh that is going to be disconnected if confirmed by the user (708-718). A result of using edge cut sub-function 628 and vertex cut sub-function 630 to unwrap and flatten a single mathematical sphere surface is illustrated by reference to FIGS. 6a-6l.

The edge seam sub-function 634 allows the user to seam mesh sections together along edges. The user is prompted to select with a locating instrument (734) edges to be seamed (736-748). When separate disconnected meshes are seamed together, the meshes are united into one individual mesh structure in the system. If the separate meshes belong to separate regions, the regions are also united into one surface region.

The vertex seam sub-function 632 allows the user to select with a locating instrument (720) each desired vertex to be seamed. All vertices selected are merged into a single vertex (722-730). These vertices can be simply a disconnection in a mesh or may be on the boundary of completely disconnected meshes. When separate disconnected meshes are seamed together with a common vertex, the meshes remain distinct and only have common vertex node(s). This allows meshes to be pinned together yet still be allowed to be treated as separate units for such sub-functions as translating or rotating a mesh. If the vertex seam sub-function 632 is applied to vertices in separate meshes belonging to separate regions, the regions are united into a single region.

If the topology of the surface region is such that it bends or folds back on itself; closely enough relative to the size of the triangular elements being generated, nodes in proximity-to a given node that are projected onto the node's tangent plane, may cause links to be generated from the given node to nodes that are really distance from it considering a path along the surface region. This results in links being created that bridge from one part of the surface region to another where the links do not lie on the surface of the object. If the areas where the surface region folds back closely together are separate mathematical surfaces, this problem can be overcome by splitting the surface region up in to sub-regions where each sub-region is meshed separately. Then all the sub-region meshes are seamed together into one region mesh along edges defined by common surface curves. In the case of surface tangent discontinuities, this limitation also comes in to play. For regions that contain tangent discontinuities where the angle formed is less than approximately 120°, the present invention comprehends that separate regions be defined and meshed and then seamed together as necessary to form one regional mesh.

The present invention may be applied to surface regions of a three-dimensional object to be meshed that are ruled and those that contain non-zero Gaussian curvature. The surface region may be any arbitrarily bounded shape or the surface region may be unbounded like a sphere. A closed three-dimensional form, like a sphere, can be covered with a single connected mesh by simply providing a single vertex point. The surface region need not necessarily be connected. Island meshes of any shape can be accommodated and logically treated as a single region. If the surface region is ruled, i.e., it's Gaussian curvature is every where zero, the shape of the resulting flat (x,y) plane mesh boundary will match the analytical solution. If there is any non-zero Gaussian curvature in the surface region, the lengths of the links in the (x,y) plane cannot all be made to equal the length of the corresponding links in the (x,y,z) surface region. However, an optimum solution is iteratively arrived at for the shape of the two-dimensional pattern. Furthermore, by providing a color indicating scheme to display on the mesh links a color corresponding to a position on a color band key where the current maximum tension and compression in the mesh exists, the user may be apprised of the quality of the resulting solution.

If cuts are not made in surface regions of some topologies, the development of the flatten pattern may require large amounts of tension and compression. If the treatment of tension and compression remains equal in these situations, the two-dimensional mesh may crumple-up and the flat pattern development will not continue in a sensible manner. For these cases, the present invention comprehends separate and distinct treatment of tension and compression to be such that the affect of either tension or compression is reduced. This will allow the development of flat patterns from surfaces that may contain large amounts of Gaussian curvature. Furthermore, the present invention provides the skilled artisan with the ability to consider the material properties of particular surface coverings.

Changes and modifications in the specifically described embodiments can be carried out without departing from the principles of the invention which is intended to be limited only by the scope of the appended claims, as interpreted according to the principles of patent law, including the Doctrine of Equivalents.

The embodiments of the invention in which an exclusive property or privilege is claimed are defined as follows:

1. A method for developing a two-dimensional shape that approximates a three-dimensional surface region mapped to a flat plane using a computer-assisted design system, said surface region capable of spanning a plurality of mathematically defined surfaces joined together at surface boundaries, said surface region having at least one curve defining a discontinuity in said surface region that forms a boundary of said region independent of said surface boundaries, including the step of:

growing a regional mesh on said three-dimensional surface region capable of spanning a plurality of mathematically defined surfaces joined together at surface boundaries, said mesh conforming to the topology of the surface region and said at least one curve and being independent of said surface boundaries, wherein said mesh spans the boundaries of the corresponding mathematically defined surfaces, said mesh including nodal points interconnected by links defining polygonal elements between said links; and mapping said polygonal elements to said flat plane and assembling said polygonal elements in a two-dimensional shape.

2. The method in claim 1 wherein said growing includes defining at least one growing surface distinct from said parametric spline patch surfaces, locating additional nodal points on said at least one growing surface and dropping the additional nodal points onto the respective parametric spline patch surface.

3. The method in claim 2 wherein said at least one growing surface includes a local tangent plane defined in the vicinity of an existing nodal point.

4. The method in claim 1 including a vertex defining a point on said surface region, and wherein said growing is initiated by locating a vertex nodal point at said vertex and locating edge nodal points along said curve and proceeds by positioning additional nodal points with respect to said previously positioned nodal points.

5. The method in claim 1 wherein said plurality of spline patch surfaces have mathematic definitions establishing grid meshes and wherein said dropping includes defining volume elements with the grid mesh associated with the respective surface and determining which one of said volume elements each of said nodal points is in.

6. The method in claim 5 wherein said determining includes defining a cube structure with nodal points and locating said volume elements using said cube structure.

7. The method in claim 1 wherein said polygonal elements are triangular elements.

8. The method in claim 1 wherein said growing a regional mesh includes interconnecting nodal points on different ones of said parametric spine patch surfaces that overlap or are separate but adjacent.

9. The method in claim 1 wherein said curve defining a discontinuity may be one of an outer boundary of said surface region and an internal edge of said surface region that becomes an outer boundary of said two-dimensional shape, and wherein said growing includes duplicating ones of said nodal points located along said internal edge for each portion of said two-dimensional shape adjacent said edge.

10. The method in claim 1 including repositioning said nodal points after completion of the mesh by recursively comparing the length of the links joined with each nodal point.

11. A method for developing a two-dimensional shape that approximates a three-dimensional surface region mapped to a flat plane using a computer-assisted design system, said three-dimensional surface region capable of spanning a plurality of mathematically defined surfaces, said surface region having at least one curve defining a discontinuity in said surface region that forms a boundary of said surface region, including the steps of:

growing a mesh on said three-dimensional surface capable of spanning a plurality of mathematically defined surfaces wherein said mesh is grown independent of the boundaries of said mathematically defined surfaces, said mesh conforming to the topology of the three-dimensional surface region and said at least one curve, said mesh including nodal points interconnected by links defining polygonal elements between said links, wherein said growing includes defining at least one growing surface distinct from the three-dimensional surface region, locating additional nodal points on said at least one growing surface and mapping the additional nodal points from said at least one growing surface onto the three-dimensional surface region such that they lie on the three-dimensional surface region; and mapping said polygonal elements to said flat plane and assembling said polygonal elements in a two-dimensional shape.

12. The method in claim 11 wherein said polygonal elements are triangular elements.

13. The method in claim 12 wherein said growing includes enclosing each existing nodal point with triangles on the plane tangent at that particular existing nodal point.

14. The method in claim 11 wherein said at least one growing surface includes a tangent plane defined in the vicinity of an existing nodal point.

15. The method in claim 11 including a vertex defining a point on said surface region, and wherein said growing is initiated by locating a vertex nodal point at said vertex and locating edge nodal points along said curve and proceeds by positioning additional nodal points with respect to previously positioned nodal points.

16. The method in claim 15 wherein said growing includes determining at each nodal point the number of links connected with that particular nodal point and positioning more nodal points in response to said positioning.

17. The method in claim 11 wherein said dropping includes defining a grid mesh conforming to the topology of the three-dimensional surface region, defining volume elements with said grid mesh and determining which of said volume elements the particular nodal point is in.

18. The method in claim 17 wherein said determining includes defining a cube structure with nodal points and locating said volume elements using said cube structure.

19. The method in claim 11 including repositioning said nodal points after completion of the mesh by recursively comparing the length of the links joined with each nodal point.

20. A method for developing a two-dimensional shape that approximates a three-dimensional surface region mapped to a flat plane using a computer-assisted design system, said three-dimensional surface region capable of spanning a plurality of mathematically defined surfaces, said surface region having at least one curve defining a discontinuity in said surface region that forms a boundary of said surface region, including the steps of:

growing a regional mesh on said surface region capable of spanning a plurality of mathematically defined surfaces wherein said mesh is grown independent of the boundaries of said mathematically defined surfaces, said mesh conforming to the topology of the surface region by growing a ribbon of polygonal elements conforming to the topology of the surface region along each said curve and growing interior polygonal element conforming to the topology of the surface region to said ribbons until said polygonal elements substantially cover said surface region, said mesh including nodal points interconnected by links defining said polygonal elements between said links;

mapping at least one of said nodal points to a location in said flat plane; and mapping said polygonal elements to a location in said flat plane where said polygonal elements will share at least one nodal point with other ones of said polygonal elements previously mapped to said flat plane in a manner that said polygonal elements are located in ring portions generally concentric with said at least one of said nodal points in order to develop a two-dimensional shape.

21. The method in claim 20 wherein said at least one of said nodal points is included in substantially the last said polygonal element grown to said mesh on said surface region.

22. The method in claim 20 including receiving a user selection of one of said at least one curve defining a discontinuity and duplicating the nodes and links along the selected curve.

23. The method in claim 20 including receiving a user selection of regions enclosed by curves selected by the user and deleting the mesh from selected regions.

24. The method in claim 20 including receiving a user selection of curves on said flat plane defining discontinuities in said two-dimensional shape.

25. The method in claim 20 including receiving a user selection of regions enclosed by curves selected by the user and deleting the mesh from selected regions.

26. The method in claim 20 including receiving a user selection of edges of at least two surface regions and joining the mesh of said surface regions conforming to the topology of the mathematically defined surfaces.

27. A method of growing a mesh conforming to the topology of two-dimensional and three-dimensional surface regions using a computer-assisted design system, said surface regions capable of spanning a plurality of mathematically defined surfaces and having at least one edge therein and at least one vertex defining a point on said edge, said mesh including nodal points interconnected by links defined triangular elements between said links, including the steps of:

distributing nodal points along each edge of a surface region capable of spanning a plurality of mathematically defined surfaces;

growing a ribbon of triangular elements along each said edge by at least partially enclosing said edge nodal points with triangular elements and thereby establishing additional nodal points, said ribbon conforming to the topology of the surface region, said ribbon grown independent of the boundaries of said mathematically defined surfaces; and growing interior triangular elements conforming to the topology of the surface region by at least partially enclosing said additional points with triangular elements, said interior triangular elements grown independent of the boundaries of said at least one mathematically defined surface.

28. The method in claim 27 wherein said nodal points are distributed along said at least one edge from said vertex at increments established by the length of said links and wherein said growing a ribbon includes at least partially enclosing said vertex with triangular elements.

29. The method in claim 28 further including receiving a user selection of a desired length of said links.

30. The method in claim 27 including repositioning said nodal points after completion of the mesh by recursively comparing the length of substantially all links joined with each nodal point.

31. A method for growing a mesh conforming to the topology of a three-dimensional surface region using a computer-assisted design system, said three-dimensional surface region capable of spanning a plurality of mathematically defined surfaces and having at least one vertex defining a point on said three-dimensional surface region, said mesh including nodal points interconnected by links defining polygonal elements between said links, including the steps of:

defining at least one growing surface distinct from the three-dimensional surface region defined by a plurality of mathematically defined surfaces, locating additional nodal points on said at least one growing surface and napping the additional nodal points from said at least one growing surface onto the three-dimensional surface such that said additional nodal points lie on the three-dimensional surface, said mapping being independent of the boundaries of said mathematically defined surfaces.

32. The method in claim 31 wherein said polygonal elements are triangular elements.

33. The method in claim 31 wherein said at least one growing surface includes a local tangent plane defined in the vicinity of an existing nodal point.

34. The method in claim 33 wherein said growing includes enclosing each existing nodal point with polygonal elements on said tangent plane in the vicinity of that particular existing nodal point.

35. The method in claim 31 wherein said growing is initiated by locating a vertex nodal point at said vertex and proceeds by positioning additional nodal points with respect to previously positioned nodal points.

36. The method in claim 35 wherein said growing includes determining at each nodal point the number of links connected with that particular nodal point and positioning more nodal points in response to said determining.

37. The method in claim 31 wherein said dropping includes defining a grid mesh conforming to the topology of the three-dimensional surface region, defining volume elements with said grid mesh and determining which of said volume elements the particular nodal point is in.

38. The method in claim 37 wherein said determining includes defining a cube structure with nodal points and locating said volume elements using said cube structure.

39. The method in claim 31 including repositioning said nodal points after completion of the mesh by recursively comparing the length of the links joined with each nodal point.

40. A method for wrapping a shaped surface from a two-dimensional plane to a three-dimensional destination surface region capable of spanning a plurality of mathematically defined surfaces and unwrapping a shaped surface from a three-dimensional surface region capable of spanning a plurality of mathematically defined surfaces to a flat destination surface using a computer assisted design system, including the steps of:

growing a mesh conforming to the topology of the shaped surface, said mesh including nodal points interconnected by links defining polygonal elements between said links;

defining a growing surface distinct from the three-dimensional surface region capable of spanning a plurality of mathematically defined surfaces;

mapping said nodal point and a plurality of said polygonal elements enclosing said nodal point to said growing surface;

rotating and translating said growing surface; and mapping said nodal point and said plurality of said polygonal elements enclosing said nodal point from said growing surface to the destination surface.

41. The method in claim 40 wherein said step of growing a mesh conforming to the topology of the shaped surface includes mapping one said nodal point from a plane of origin to said growing surface, enclosing said one nodal point with a plurality of polygonal elements in order to generate additional nodal points and mapping said nodal points to said plane of origin.

42. The method in claim 40 wherein said growing surface is a two-dimensional plane.

43. The method of claim 40 wherein said three-dimensional surface region is covered by at least one grid mesh and wherein said step of mapping from said growing surface to the destination surface includes defining volume elements with said at least one grid mesh and determining which one of said volume elements said nodal point is in.

44. The method in claim 43 wherein said determining includes defining a cube structure with nodal points and locating said volume elements using said cube structure.

45. The method in claim 40 including repositioning said nodal points after completion of the mesh by recursively comparing the length of the links joined with each nodal point.

46. The method in claim 45 including repositioning said nodal points after said mapping between said growing surface and the destination surface by recursively comparing the length of the links joined with each node.

47. A method for growing a mesh conforming to the topology of a three-dimensional surface region using a computer-assisted design system, said three-dimensional surface region capable of spanning a plurality of mathematically defined surfaces, said mesh including nodal points interconnected by links defining polygonal elements between said links, including the steps of:

distributing nodal points along each edge of a three-dimensional surface region capable of spanning a plurality of mathematically defined surfaces;

growing a ribbon of triangular elements along each said edge by at least partially enclosing said edge nodal points with polygonal elements and thereby establishing additional nodal points, said ribbon conforming to the topology of the three-dimensional surface region, said ribbon grown independent of the boundaries of said mathematically defined surfaces;

growing interior polygonal elements conforming to the topology of the three-dimensional surface region by at least partially enclosing said additional points with polygonal elements, said interior polygonal elements grown independent of the boundaries of said mathematically defined surfaces; and wherein said steps of growing includes projecting an existing nodal point to a growing surface distinct from said three-dimensional surface, establishing new nodal points on said growing surface by enclosing the particular existing nodal point with polygonal elements, and mapping the existing and new nodal points from the growing surface normally to the three-dimensional surface.

48. The method in claim 47 including eliminating occurrences of nodal points being enclosed by other than a predetermined number of polygonal elements.

49. The method in claim 47 including repositioning nodal points in the mesh by comparing distances between nodal points on said three-dimensional surface region and on said growing surface.

50. A computer-assisted design apparatus for generating a two-dimensional pattern image that is a close approximation of a flattened three-dimensional surface region, said three dimensional surface region capable of spanning a plurality of mathematically defined surfaces and including at least one curve establishing a discontinuity in said three-dimensional surface region that forms a boundary of said region comprising:

a mesh generator adapted to growing a regional mesh on said three-dimensional surface region capable of spanning a plurality of mathematically defined surfaces wherein said mesh is grown independent of the boundaries of said mathematically defined surfaces, said mesh conforming to the topology of the three-dimensional surface region by growing a ribbon of polygonal elements conforming to the topology of the three-dimensional surface region along each said curve and growing interior polygonal elements conforming to the topology of the surface region to said ribbons until said polygonal elements cover said surface region, said mesh including nodal points interconnected by links defining said polygonal elements between said links; and means for mapping said nodal points to a flat plane and for locating nodal points in said flat plane, said means for mapping being adapted to locating at least one of said nodal points in said flat plane and said polygonal elements in said flat plane in a manner at said polygonal elements will share at least one nodal point with other ones of said polygonal elements previously mapped to said flat plane and are in ring portions generally concentric with said at least one of said nodal points in order to develop a two-dimensional shape.

51. The computer-assisted design apparatus in claim 50 including means for receiving a user selection of one said at least one curve and duplicating the nodes and links along the selected curve.

52. The computer-assisted design apparatus in claim 50 including means for receiving a user selection of regions enclosed on said three-dimensional surface region and for deleting the mesh from said regions.

53. The computer-assisted design apparatus in claim 50 including means for receiving a user selection of at least two surface regions and for joining the mesh of said surface regions conforming to the topology of said mathematically defined surfaces.

54. In a computer assisted design system, an apparatus that is adapted to growing a mesh conforming to the topology of a three-dimensional surface region, said three-dimensional surface region capable of spanning a plurality of mathematically defined surfaces, said mesh including nodal points interconnected by links defining polygonal elements between said links, said apparatus comprising:

a perimeter nodal point generator that is adapted to generating and distributing nodal points along each said edge of a three-dimensional surface region capable of spanning a plurality of mathematically defined surfaces and growing a ribbon of polygonal elements along each said edge by at least partially enclosing said edge nodal points with polygonal elements and thereby establishing additional nodal points, said ribbon conforming to the topology of the three-dimensional surface region, said ribbon grown independent of the boundaries of said mathematically defined surfaces;

an interior nodal point generator that is adapted to developing polygonal elements conforming to the topology of the surface by at least partially enclosing said additional points with polygonal elements, said polygonal elements developed independent of the boundaries of said mathematically defined surfaces; and wherein said nodal point generators include means for projecting an existing nodal point to a growing surface distinct from the three-dimensional surface region for establishing new nodal points on said growing surface by enclosing the particular existing nodal point with polygonal elements, and for mapping the existing and new nodal points from the growing surface to the three-dimensional surface.

55. The apparatus in claim 54 including means for eliminating occurrences of nodal points that are enclosed by other than a predetermined number of polygonal elements.

56. The apparatus in claim 55 including means for repositioning nodal points in the mesh by comparing distances between nodal points on said three-dimensional surface region and on said local tangent plane.

57. A method for wrapping a two-dimensional shape to a three-dimensional surface region capable of spanning a plurality of mathematically destined surfaces joined together at surface boundaries using a computer-assisted design system, including the steps of:

growing a mesh conforming to the topology of the two-dimensional shape, said mesh including nodal points interconnected by links defining polygonal elements between said links; and mapping said polygonal elements to said three-dimensional surface capable of spanning a plurality of mathematically defined surfaces joined together at surface boundaries and assembling said polygonal elements in a three-dimensional shape conforming to the topology of the three-dimensional surface region, independent of said surface boundaries of said mathematically defined surfaces.

58. The method in claim 57 wherein said mapping includes mapping said nodal points from said mesh to a growing surface that is distinct from said three-dimensional surface region, rotating and translating said growing surface, and mapping said nodal points from said growing surface to said three-dimensional surface region.

59. The method in claim 57 including repositioning said nodal points after mapping said nodal points to said three-dimensional surface region.

60. The method in claim 59 wherein said repositioning includes recursively comparing the length of the links joined with each nodal point.

* * * * *

UNITED STATES PATENT AND TRADEMARK OFFICE
CERTIFICATE OF CORRECTION

PATENT NO. : 5,448,687
DATED : September 5, 1995
INVENTOR(S) : Randall J. Hoogerhyde, Chien T. Wu and Mayank Anjaria It is certified that error appears in the above-indentified patent and that said Letters Patent is hereby corrected as shown below:

Column 5, line 23:
"14a-4c" should be --14a-14c--.

Column 9, line 11:
After "as" insert --follows:--.

Column 18, line 65, claim 8:
"spine" should be --spline--.

Column 20, line 60, claim 27:
"method of" should be --method for--.

Column 21, line 42, claim 31:
"napping" should be --mapping--.

Column 23, line 61, claim 50:
"at said" should be --that said--.

Column 24, line 58:
"destined" should be --defined--.

Signed and Sealed this

Twenty-first Day of May, 1996

Attest:

BRUCE LEHMAN

*Attesting Officer*     *Commissioner of Patents and Trademarks*